United States Patent [19]

Blomberg et al.

[11] Patent Number: 5,075,881
[45] Date of Patent: Dec. 24, 1991

[54] PROCESS FOR DEVELOPING A STATISTICAL MODEL TO DETERMINE THE WORKLOAD OF AN AIRCRAFT PILOT, MODEL DERIVED THEREFROM, APPARATUS FOR THE EMBODIMENT OF THE SAID PROCESS AND APPLICATIONS OF THE MODEL

[75] Inventors: Richard D. Blomberg, Stamford, Conn.; Jean-Pierre Fouillot, St-Mandé; Jean-Jacques Speyer, Haute-Garonne, both of France

[73] Assignee: Airbus Industrie, Blagnac, France

[21] Appl. No.: 193,582

[22] Filed: May 13, 1988

[30] Foreign Application Priority Data

May 20, 1987 [FR] France ................................ 87 07048

[51] Int. Cl.⁵ .................... G06F 15/42; G06F 15/74; 434 30; G06F 15/42; G06F 15/74
[52] U.S. Cl. .............................. 364/578; 364/413.02; 364/551.01; 434/30
[58] Field of Search ................... 364/578, 554, 551.01, 364/400-402, 413.01, 413.02; 434/30, 372

[56] References Cited

U.S. PATENT DOCUMENTS 4,345,315  8/1982  Cadotte et al. ..................... 364/401
4,489,387  12/1984  Lamb et al. ..................... 364/413.02
4,779,199  10/1988  Yoneda et al. ................. 364/413.02
4,787,024  11/1988  Allsop et al. ......................... 364/578

OTHER PUBLICATIONS

Proceedings IEEE/AIAA 7th Digital Avionics Systems Conference, Fort Worth, Tex., U.S., 13 Oct.-16 Oct. 1986, pp. 315-323, Haworth et al.

Primary Examiner—Felix D. Gruber
Attorney, Agent, or Firm—Kenyon & Kenyon

[57] ABSTRACT

A process for developing a statistical model to forecast the workload of an aircraft pilot (20), in particular that of a commercial airline pilot, as a function of objective flight parameters, wherein, during the course of at least one flight (real or simulated) of the aircraft, under defined flying conditions and flight conditions and stages which constitute the flight parameters, the aircraft pilot is asked to provide a rating of his workload according to a predefined scale, wherein this rating is logged at the same time as the corresponding flight parameters, and, simultaneously, the value of the significant data of the said parameters is measured, wherein, finally, a statistical correlation is established between the workload rating values on the one part and the aforesaid data and flight parameters on the other part.

Applicable to certification and development of an aircraft and training and skills development, to performance supervision and monitoring of an aircraft pilot's extent of adaptation to a new aircraft.

16 Claims, 15 Drawing Sheets

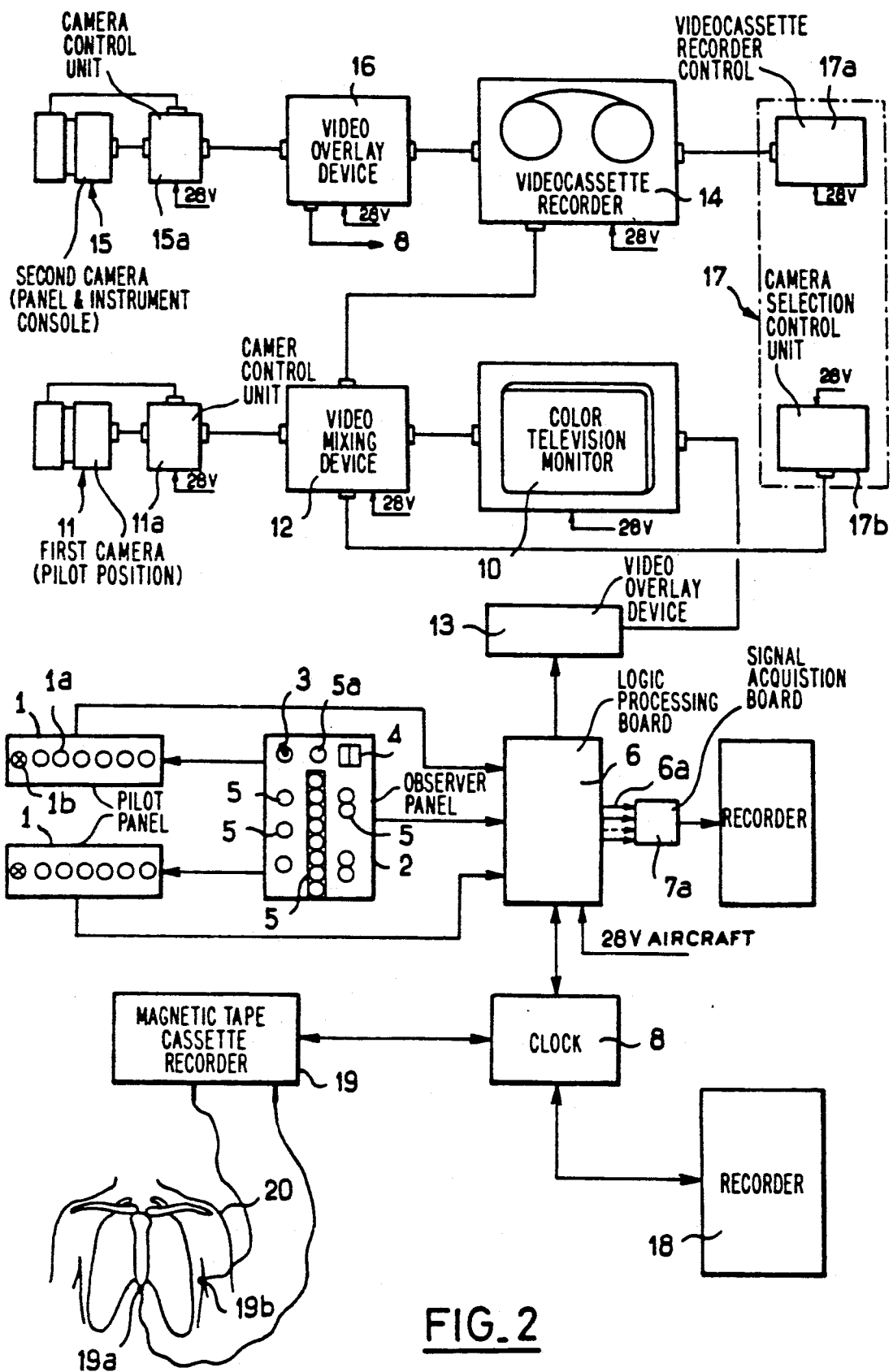
FIG_2

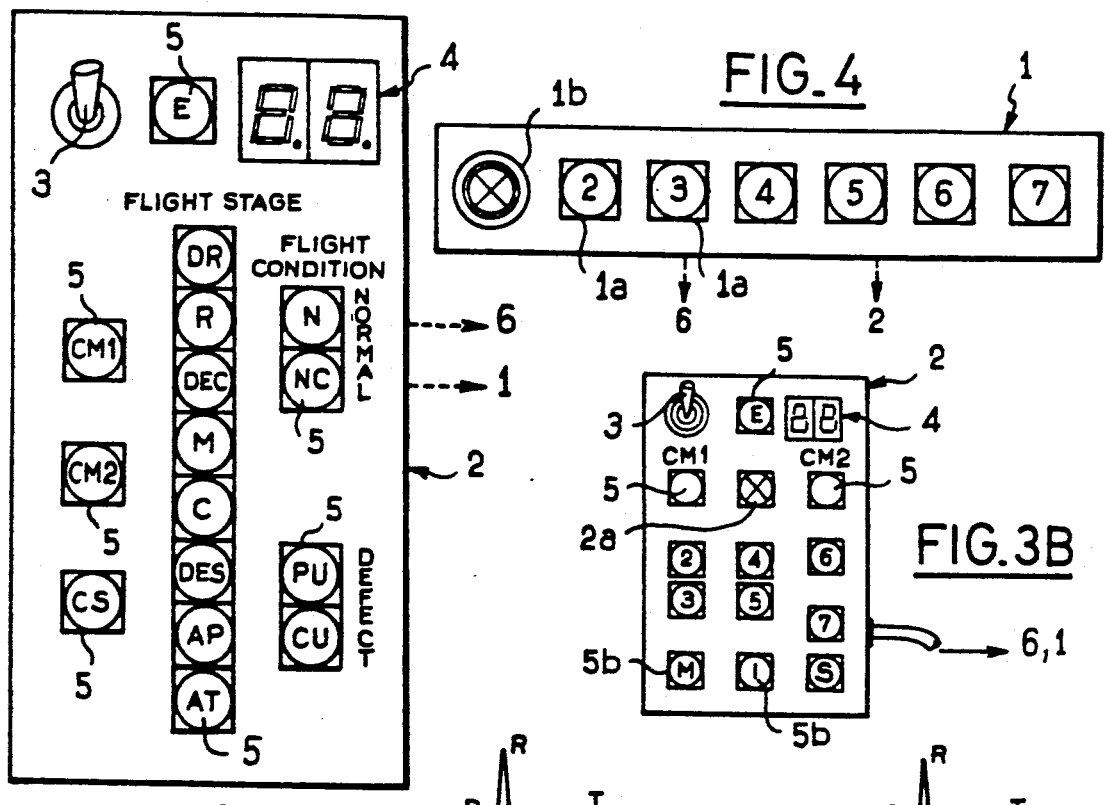
FIG. 4
FIG. 3B
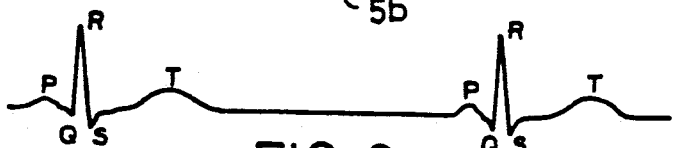
FIG. 6
FIG. 3A
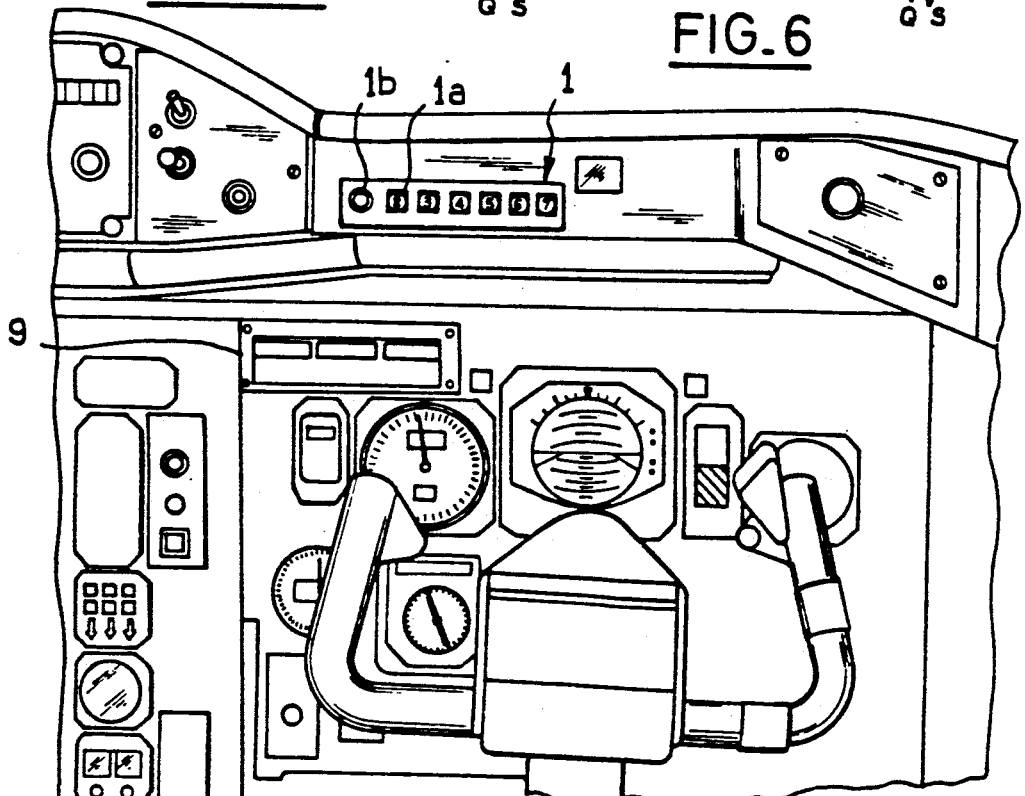
FIG. 5

FIG_6A

FIG_9

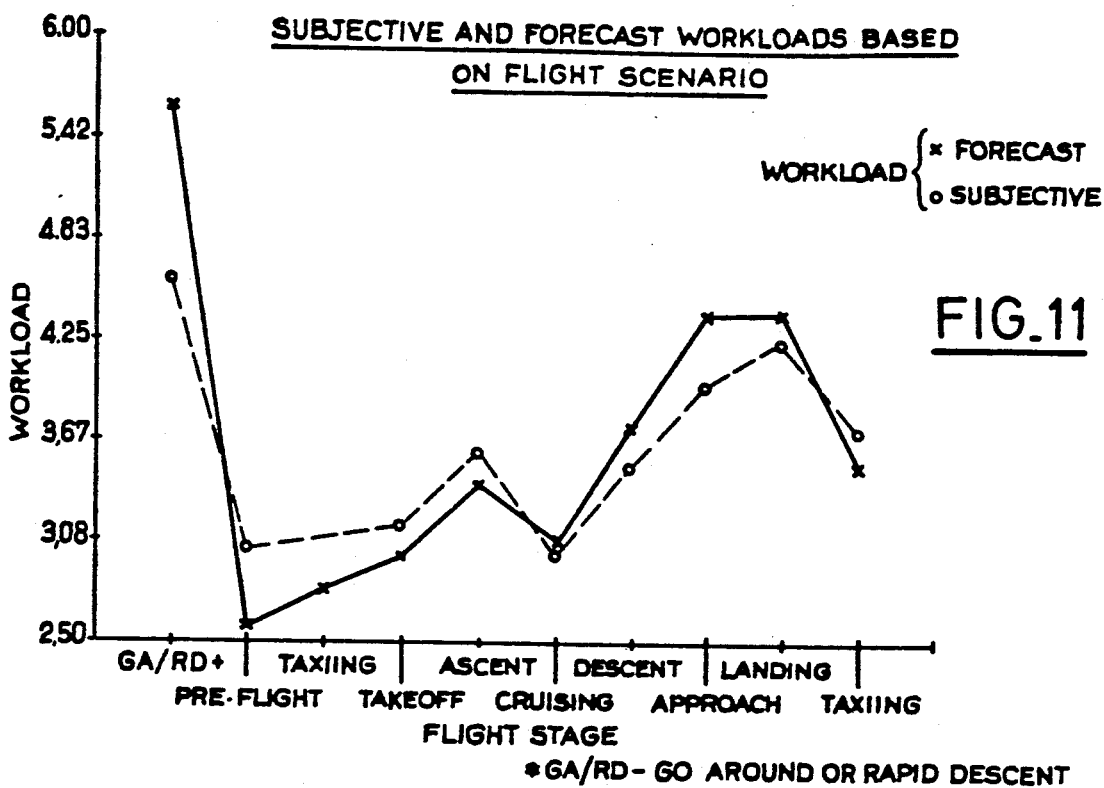
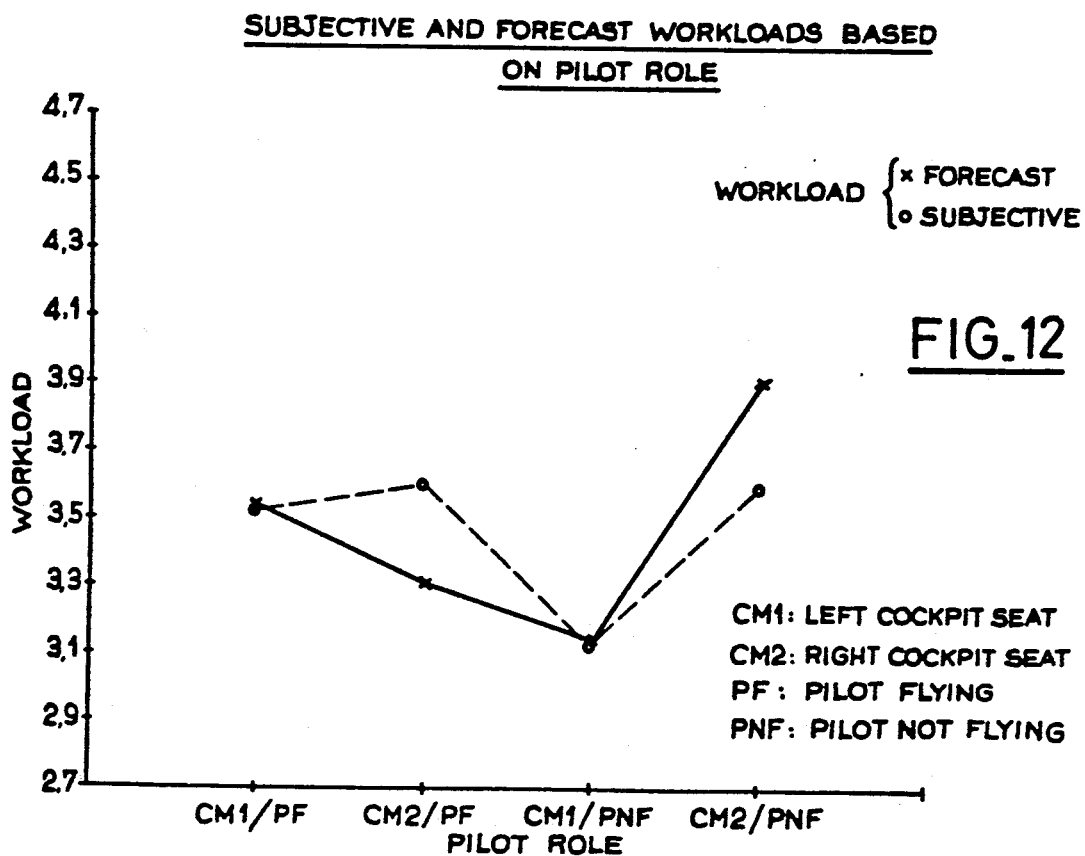

PROCESS FOR DEVELOPING A STATISTICAL MODEL TO DETERMINE THE WORKLOAD OF AN AIRCRAFT PILOT, MODEL DERIVED THEREFROM, APPARATUS FOR THE EMBODIMENT OF THE SAID PROCESS AND APPLICATIONS OF THE MODEL

This invention relates to a process for developing a statistical model to forecast the workload of an aircraft pilot, particularly that of a commercial airline pilot, based on objective flight parameters.

The invention further relates to the statistical model developed using the process under consideration, as a product for use in the industry.

The invention still further relates to various applications of this model, and more particularly to the certification of aircraft flight crew assignments, to the development of new aircraft and to the training, skills development, performance supervision and monitoring of the extent of adaptation of aircraft pilots to a new aircraft. The invention additionally relates to an apparatus for the embodiment of the aforesaid process.

The workload demand placed on commercial airline pilots is a major source of concern for aircraft manufacturers and airlines for at least two reasons: It is widely acknowledged that elevated workload levels increase the probability of pilot error and reduce the pilot's ability to respond to emergency situations. In addition, the ability to demonstrate that aircraft crew workloads do not exceed acceptable levels is a factor of fundamental importance in the approval procedure that must be followed to obtain aircraft certification from the regulatory authorities.

There is no unanimous agreement on the definition of the term "workload." Although most researchers make a distinction between the "subjective" workload and the "actual" workload, written works on this subject also contain numerous vague references to "workloads" without clearly specifying whether these denote subjectively, perceived workloads or actual workloads.

There exist a number of studies on workloads which focus on pilots and the relatively complex environment prevailing in a flight deck and while flying in zones where aerial traffic density ranges from high to low. However, few data are available on commercial airline pilots under real flying conditions. The in-depth study conducted by the U.S. Air Force in the Air Force Aerospace Medical Research Laboratory (AFAMRL) was limited to military aircraft and systems (Shingledecker, 1983). When civilian pilots were used, tests were conducted using simulators or similar laboratory facilities.

Research on workloads has focused primarily on two major areas. The first relates to development of a workload theory or of a model that would accurately reflect the operation of the human information processing system and describe the nature of the capabilities of this system which limits performance (Shingledecker, 1983). None of the models developed to date has gained unanimous acceptance. Certain researchers emphasize the external environment as a fundamental source of workloads. Others cite pilot skills as the major determining factor of workload and attempt to establish reserve capacity as a measurement of workload. Still others base their assumptions on the subjective nature of workload according to the theory that pilots must "feel" stress in order to experience stress. Finally, one research group sets forth the concept of workload as a hypothetical state determined by multiple factors but having no life of its own. According to this view, work demands mental operations and subjective impressions combine with numerous other conditional variables such as training, fatigue, motivation and physical condition to produce an individual's real ability to perform (O'Donnell and Enggemeier, 1983).

The second major area of research in the field relates to measuring workload, regardless of how the term is defined, and to developing techniques for measuring physiological and subjective behavior. Numerous studies have focused on developing three types of workload measurements. However, no significant theory has been advanced with respect to measuring the workload of commercial airline pilots during the course of "typical" flights.

The known behavioral study techniques employed to measure workload most often consist of asking the pilot to perform a secondary task while measuring the productivity level for this task when the flight scenario changes. It is assumed that the productivity level for the secondary task will drop as a function of the workload required by the primary task of flying. Basing workload estimates on pilot behavior displays a number of theoretical advantages. First, these measurements are perfectly objective and it is therefore highly unlikely that they are influenced by external factors such as motivation or inaccurate interpretations on the part of the pilot. Second, it would also be rational to use these since they are derived from human performance.

Despite the potential of behavioral study techniques, it was noted in the context of this invention that these techniques entail a number of major disadvantages, particularly if they are to be used under actual flying conditions. First, introducing a secondary task often requires additional instrumentation. Second, it may interfere with pilot performance of the primary task and thus reduce safety levels. Indeed, a valid measurement of workloads using behavioral study techniques must interfere with the primary task. Finally, a certain amount of training in the behavioral study task is required in order for this study to be used in a reliable manner. Because of these limitations, research on workload measurements using behavioral studies has been substantially restricted to the laboratory or flight simulator.

Various physiological measurements have also been proposed and tested as workload measurements. These range from measuring fluctuations in heart rates (arrhythmia) to highly complex neurophysiological tests such as those studied by AFAMRL (O'Donnell, 1983). These physiological measurements all require special equipment which, for practical reasons, could not be installed in a flight deck for use during an actual flight. The relationship between heart rates and workloads has also been studied, and measurements of heart rate fluctuations have been extensively researched (Mulder and Mulder-Hajonides Van Der Meulen, 1973). It is generally acknowledged that accurate measurements of heart rate variations displays significant potential as an indicator of one factor in a pilot's workload. This invention has in fact utilized to advantage the fact that heart rates can easily and unobtrusively be measured in flight using relatively inexpensive portable equipment.

The application of subjective pilot workload measurements has also been studied, in the context of both research and aircraft certification. As an example, Cooper and Harper (1969) developed a scale which is used to assess the flight attributes of an aircraft. It is relatively easy to apply subjective measurements with almost no implications for flight operations. These measurements have more particularly been used in the course of the airplane certification process to demonstrate that pilot ratings of workload demands imposed by a new aircraft lie within acceptable limits. However, although subjective measurements are easy to apply, to record and to analyze, they represent an additional burden in the certification process and are subject to potential distortion. If the subjective values supplied by pilots during certification tests could be accurately predicted by using a suitable model, the need to compile ratings information would be obviated.

One of the ideas underlying this invention is the following: Since real, subjective measurements integrate most of the environmental, psychological and physiological factors which determine workload, any model designed to evaluate subjective workloads should benefit from the introduction of physiological, behavioral and environmental parameters.

A first object of this invention is a process for developing a model which may be implemented in a practical manner, under both real and simulated flight conditions, to determine as accurately as possible the subjective workload of aircraft pilots, based on a reduced number of data representing one or more real aircraft flights (in particular, flights of the AIRBUS A 310 airplane) which may be measured during these flights with no negative impact on pilot workload or flight safety.

A further object of the invention is to provide for the use of the aforesaid model to simplify aircraft certification procedures and as an aid in the development of new aircraft, and further, for its application to the selection, training or skills development of aircraft pilots.

A still further object of the invention is to provide an apparatus for the reliable and convenient entry of data employed in the development and use of the said model.

This invention therefore relates to a process for developing a statistical model to forecast the workload of an aircraft pilot, particularly that of a commercial airline pilot, as a function of objective flight parameters, wherein, during the course of at least one real or simulated flight of the aircraft, the aircraft pilot, under defined flying conditions and flight conditions and stages which constitute the flight parameters, is asked to rate his workload according to a predefined scale, wherein this rating and the corresponding flight parameters are logged at the same time, and the values of the significant data of the said flight parameters are simultaneously measured, wherein, finally, a statistical correlation is established between the values of the workload ratings on the one part and the aforesaid data and the flight parameters on the other part.

By establishing a statistical correlation between the values of the workload ratings and the data denoting the flight stage and the flight and flying conditions, this invention provides for developing a model which can supply an objective assessment of the workload of an aircraft pilot based on objective flight data wherein measurement of these data during the flight does not affect flying conditions or flight safety. A model which may be implemented during the course of both real and simulated flights, with no unreasonable instrumentation requirements and without impeding aircraft navigation while covering a broad range of routine or emergency flight scenarios may, in particular, simplify the long and costly process of special test flights designed to demonstrate that a new aircraft may be flown at an acceptably low workload level. Similarly, a model meeting scientific validity and reliability criteria which is practical to use shall display significant advantages when it is applied to the development process for a new aircraft, since it will provide for an artificial means of determining the consequences of design alternatives on pilot workload.

According to one advantageous characteristic of the invention, the aforesaid process is characterized by the fact that the predetermined or calculated workload is related to the flight parameters by a relationship of the following type:

$$Yi = A1\ Xi1 + A2\ Xi2 + \ldots + Aj\ Xij + \ldots + An\ Xin + B1 + B2 + \ldots + Bk + \ldots + Bm + C$$

wherein:

$Yi$ is a variable representing the predetermined or calculated workload;

$Xij$ are variables representing the significant data of a first set of flight parameters;

constants $Aj$, $Bk$ and $C$ are coefficients of multiplication or addition characteristic of the aforesaid model, wherein the value of coefficients $Bk$ denotes a second set of flight parameters, and wherein coefficients $Aj$, $Bk$ and $C$ are calculated by applying, on the basis of the aforesaid relationship, statistical methods known as multiple linear regression analysis and analysis of variance based on the values of the workload ratings provided by the pilot and on the aforesaid data and on the flight parameters measured or recorded during the test flights.

The validity of the aforesaid statistical relationship between the pilot workload ratings and the objective flight parameters has been verified by the Applicant. The Applicant compared the predetermined workload values calculated on the basis of the aforesaid formula using data compiled during all of the actual flight trials encompassing varying flight and flying conditions. The calculated workload values were compared to the values of the pilot ratings supplied during the aforesaid flights and an excellent correspondence was established between the values of the ratings and the calculated values.

Also according to the invention, the model obtained according to the aforesaid process is characterized by the following relationship:

$$Yi = A1\ Xi1 + A2\ Xi2 + \ldots + Aj\ Xij + \ldots + An\ Xin + B1 + B2 + \ldots + Bk + \ldots + Bm + C$$

wherein:

$Yi$ is a variable representing the predetermined or calculated workload;

$Xij$ are variables representing the significant data of a first set of flight parameters;

constants $Aj$, $Bk$ and $C$ are coefficients of multiplication or addition characteristic of the model, wherein the value of coefficients $Bk$ denotes a second set of flight parameters.

Advantageously, the predetermined workload $PRi$ is expressed according to a ratings scale comprising six indexes ranging from 2 to 7, as a function of variable $Yi$, by the relationship:

$$PR_i = 3 \times 10^{Y_i} + 1,$$

wherein variables Xij denote flight data relating to the aircraft and to pilot heartbeat and heart rate variability while the parameters which determine the value of coefficients Bk are the aircraft flying and flight conditions and the flight stage at the instant when the aforesaid data are recorded.

The development of a model implementing flight data and/or flight parameters which are readily available and may be measured during routine or abnormal flight operations provides a convenient work tool. With the aid of appropriate computer hardware, the model according to the invention may thus be employed to supply objective instantaneous workload ratings during real flights or in a simulator.

Further according to the invention, the apparatus for the embodiment of the aforesaid process is characterized by the fact that it comprises means to log crew member workload assessments, means to selectively query crew members with respect to their workload and to simultaneously log the corresponding flight stage and flight conditions, wherein all of the aforesaid means are connected to means for processing and recording the data supplied by the said set of means in synchronization with a reference time clock and means of logging and/or recording the flight parameters in synchronization with the said reference clock.

In addition, the aforesaid apparatus advantageously comprises means for measuring and recording the electrocardiograms of the crew members in synchronization with the aforesaid time clock.

This apparatus is therefore particularly well adapted to the accomplishment of the aforesaid process.

According to other features, the invention relates to the application of the aforesaid model to the development of a new aircraft wherein the curve Yi=f(Xij) is employed to simulate the effect of a new aircraft characteristic on the workload of its pilots, and further relates to an application of this model to the training, skills development, performance supervision and monitoring of the extent of adaptation of an aircraft pilot to a new aircraft, wherein the performance of the said pilot is rated by calculating his predetermined workload in a defined flight situation, and its application to the certification of the flight crew assignments of a new aircraft, and is characterized by the fact that during at least one test flight of the new aircraft, under various flight conditions and stages representative of the certification rules, the flight parameters denoted by the variables Xij are measured, the corresponding values of variable Yi are calculated, from which are inferred the corresponding workload values relative to a defined scale, wherein these workload values are then compared to those of a previously certified reference aircraft.

Other characteristics and advantages of the invention shall be made apparent from the description which follows.

The appended drawings are provided as non-limiting examples, wherein:

FIG. 2 is a general schematic drawing of the apparatus for the embodiment of the process according to the invention;

FIG. 3A and FIG. 3B show front views of the "observer" panel used for workload ratings;

FIG. 4 is a front view of the "crew member" panel used to supply workload ratings;

FIG. 5 is a partial schematic drawing of the cockpit showing the installed panel of FIG. 4;

FIG. 6A is a curve illustrating an example of regression over 64 heartbeats;

Figure 16:
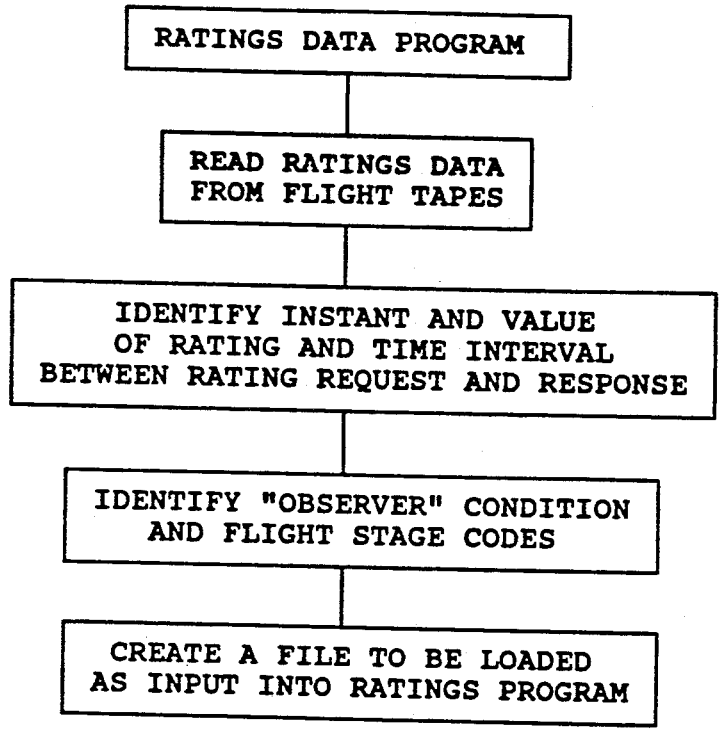
Figure 17:
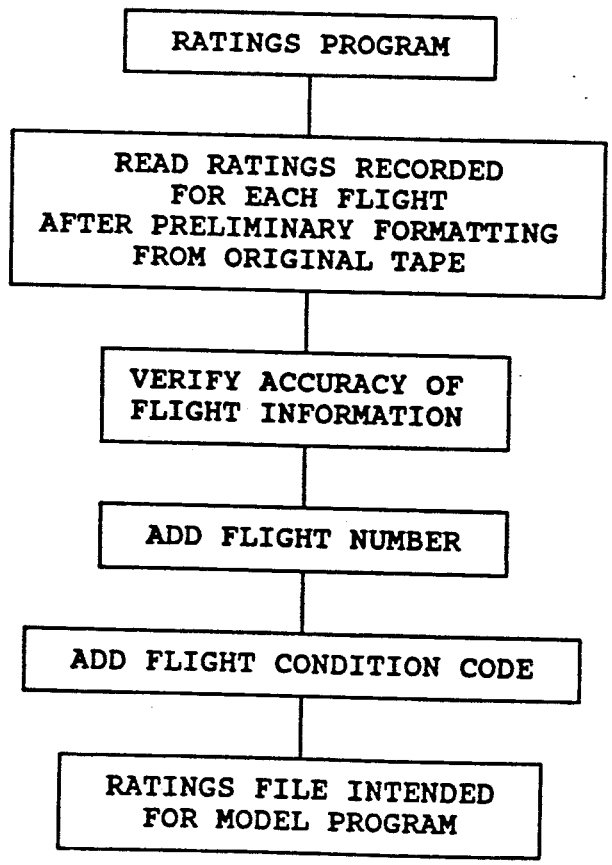
Figure 18:
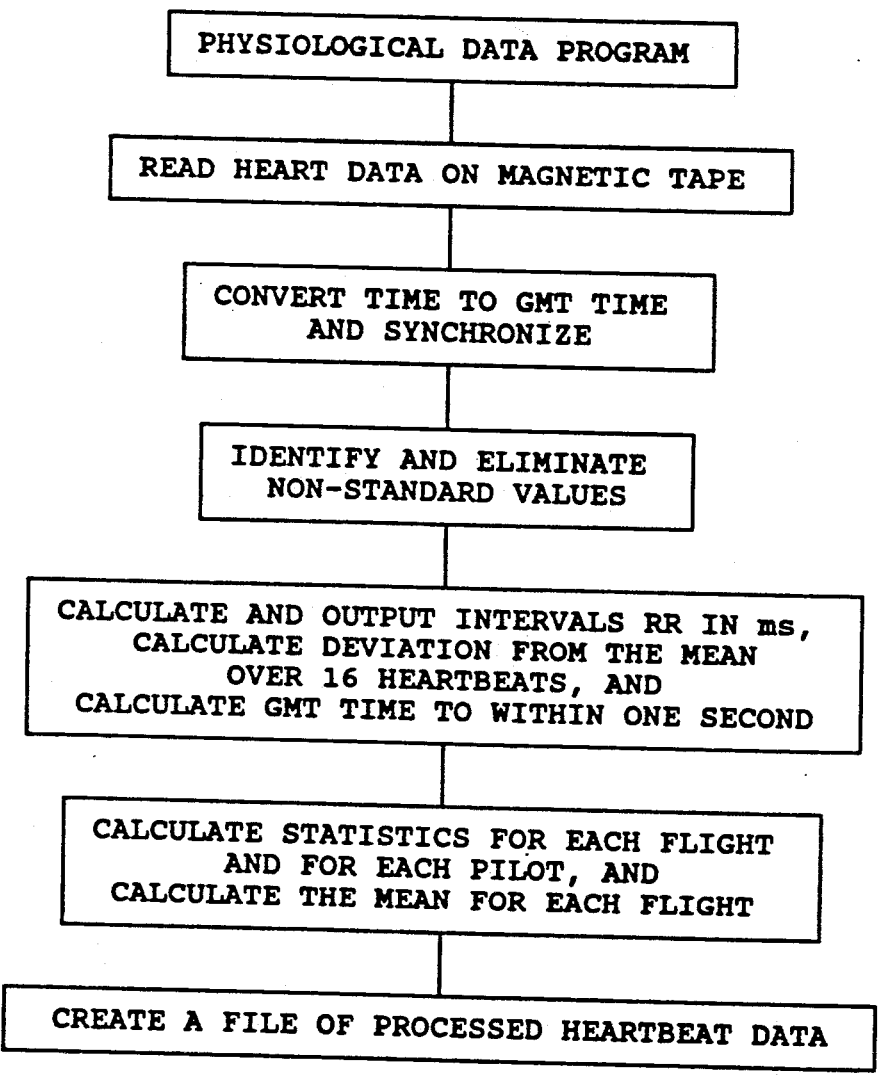
Figure 19:
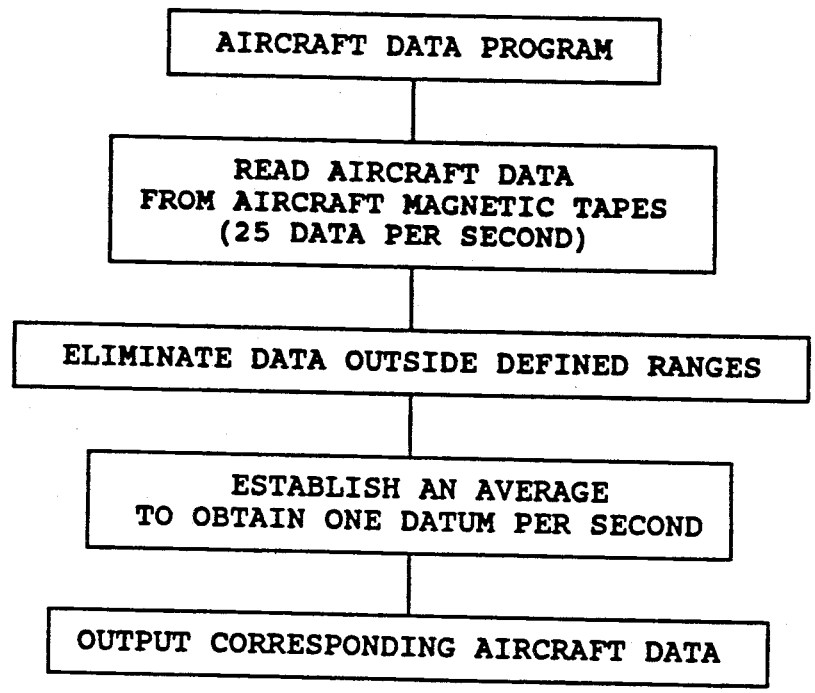
Figure 20:
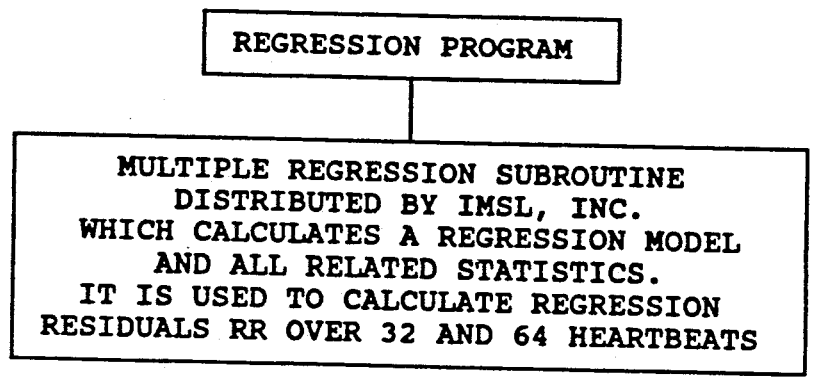
Figure 21:
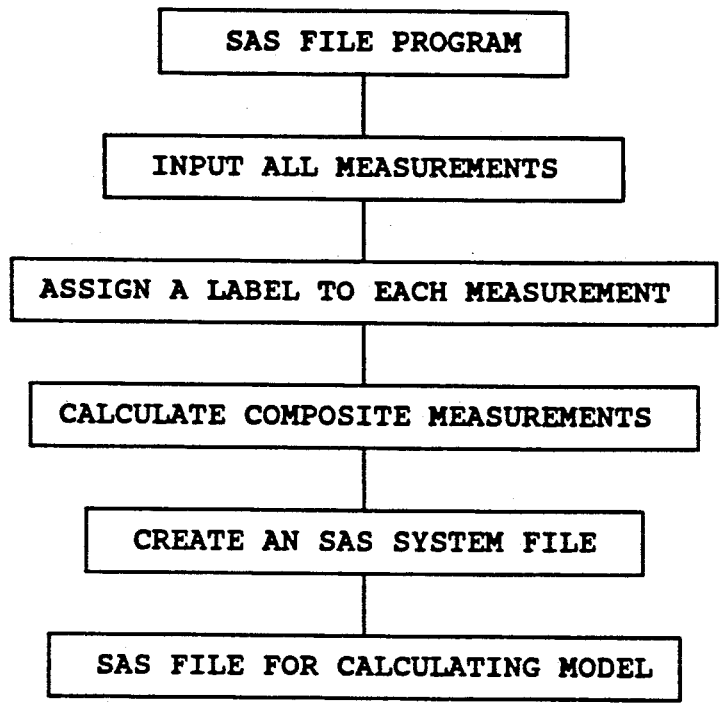
Figure 22:
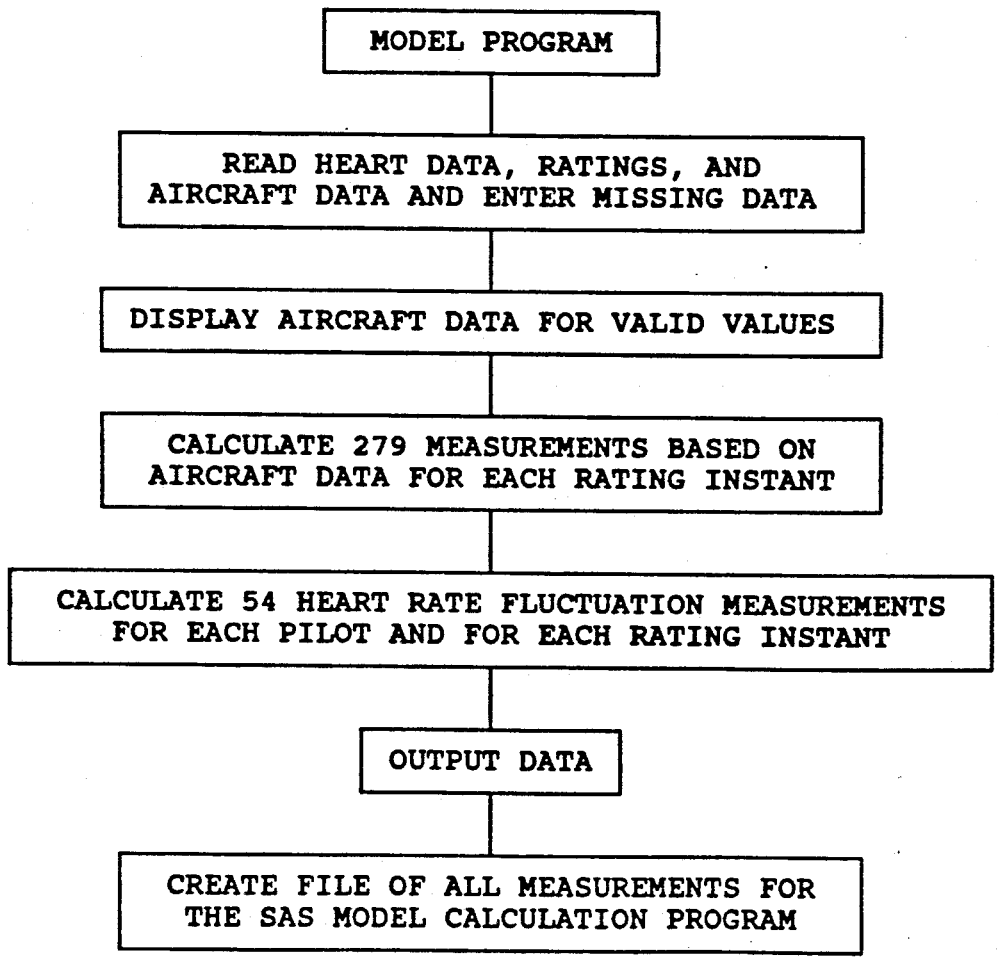
Figure 23:
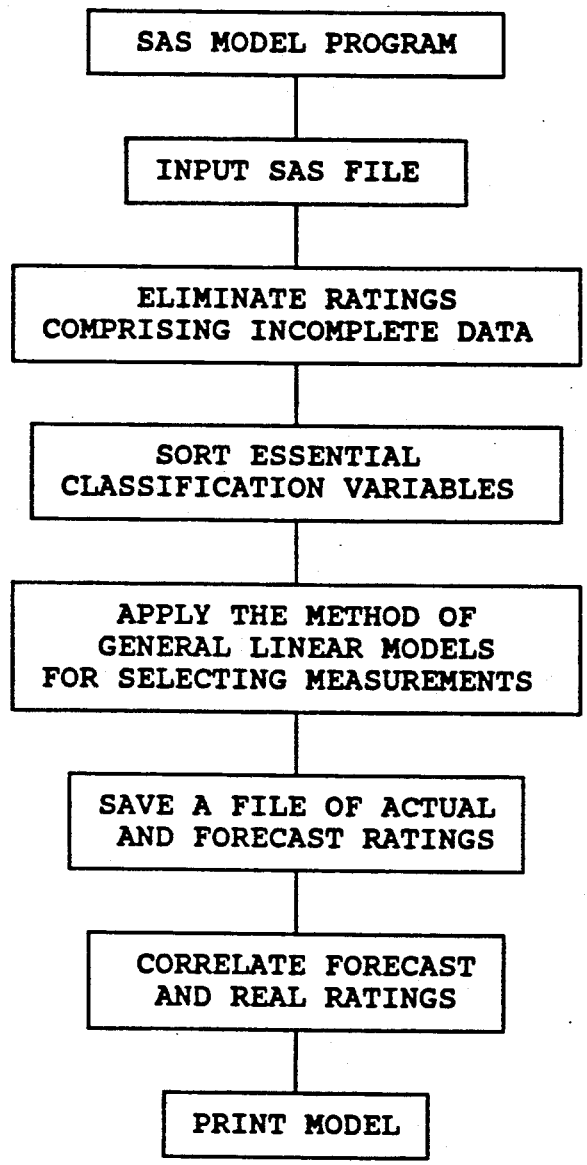

FIGS. 11 to 15 are comparative curves illustrating the correspondence between the values of subjective workload ratings and those calculated using the model according to the invention, FIGS. 16-18 are flow charts illustrating routines for computer processing of ratings data; and FIGS. 19-23 are flow charts illustrating successive routines for computer processing of aircraft data, workload ratings data, and heart rate data to compute a set of measurements for generating a statistical model according to the invention.

Figure 1:
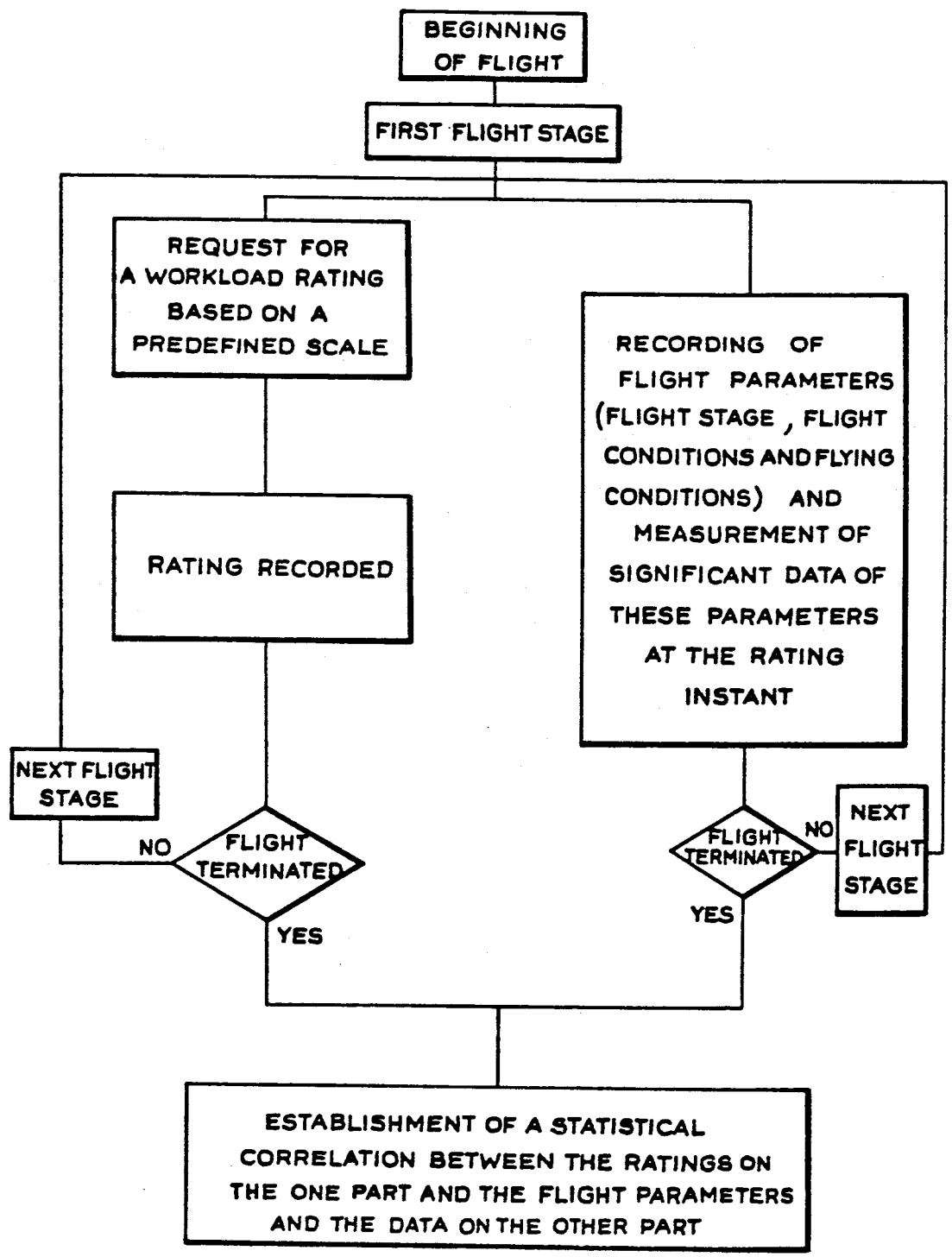
FIG. 1 is a flow chart which schematically illustrates the process according to the invention.
Figure 9:
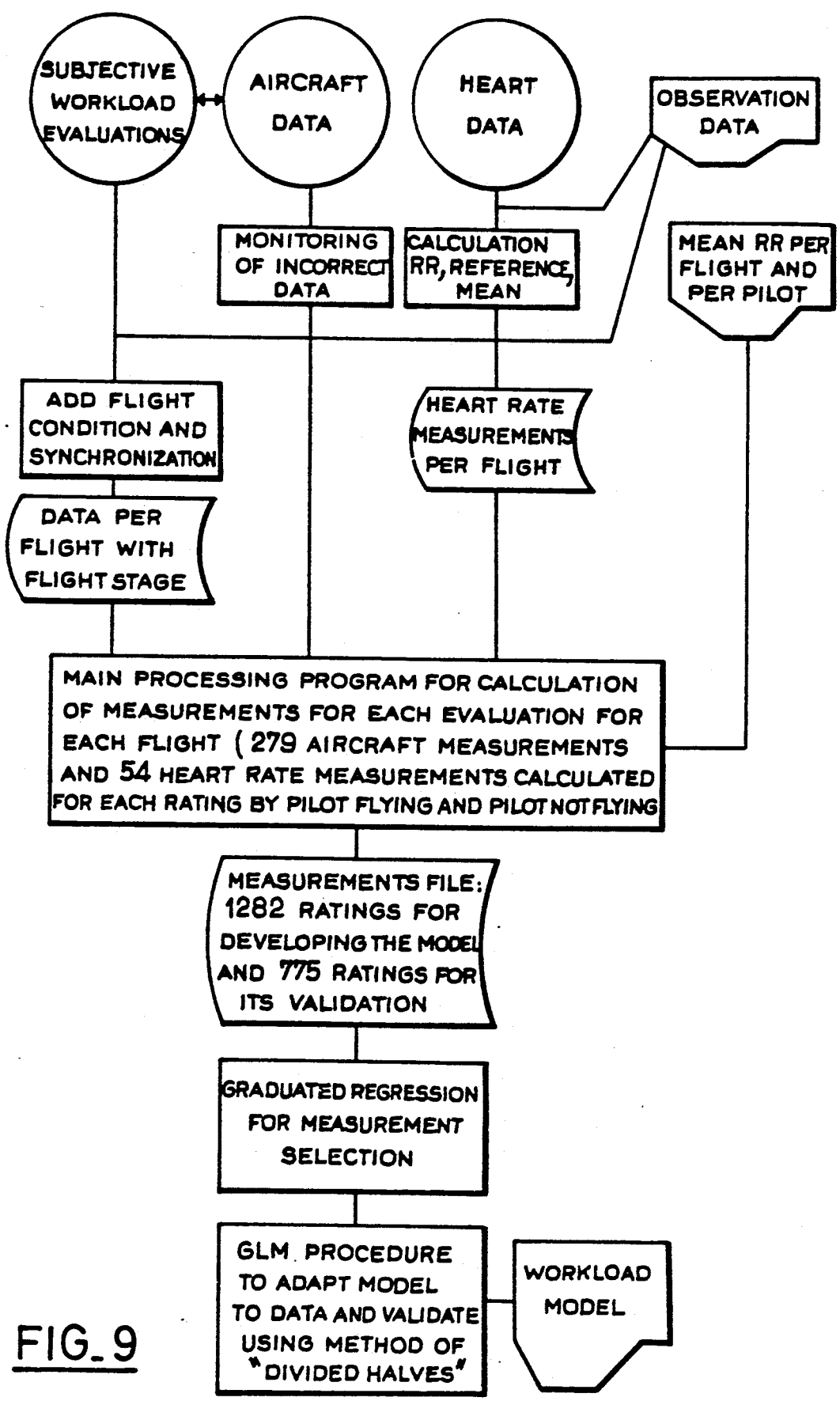
FIG. 9 is a flow chart providing a more detailed illustration of the process according to the invention.
Figure 10:
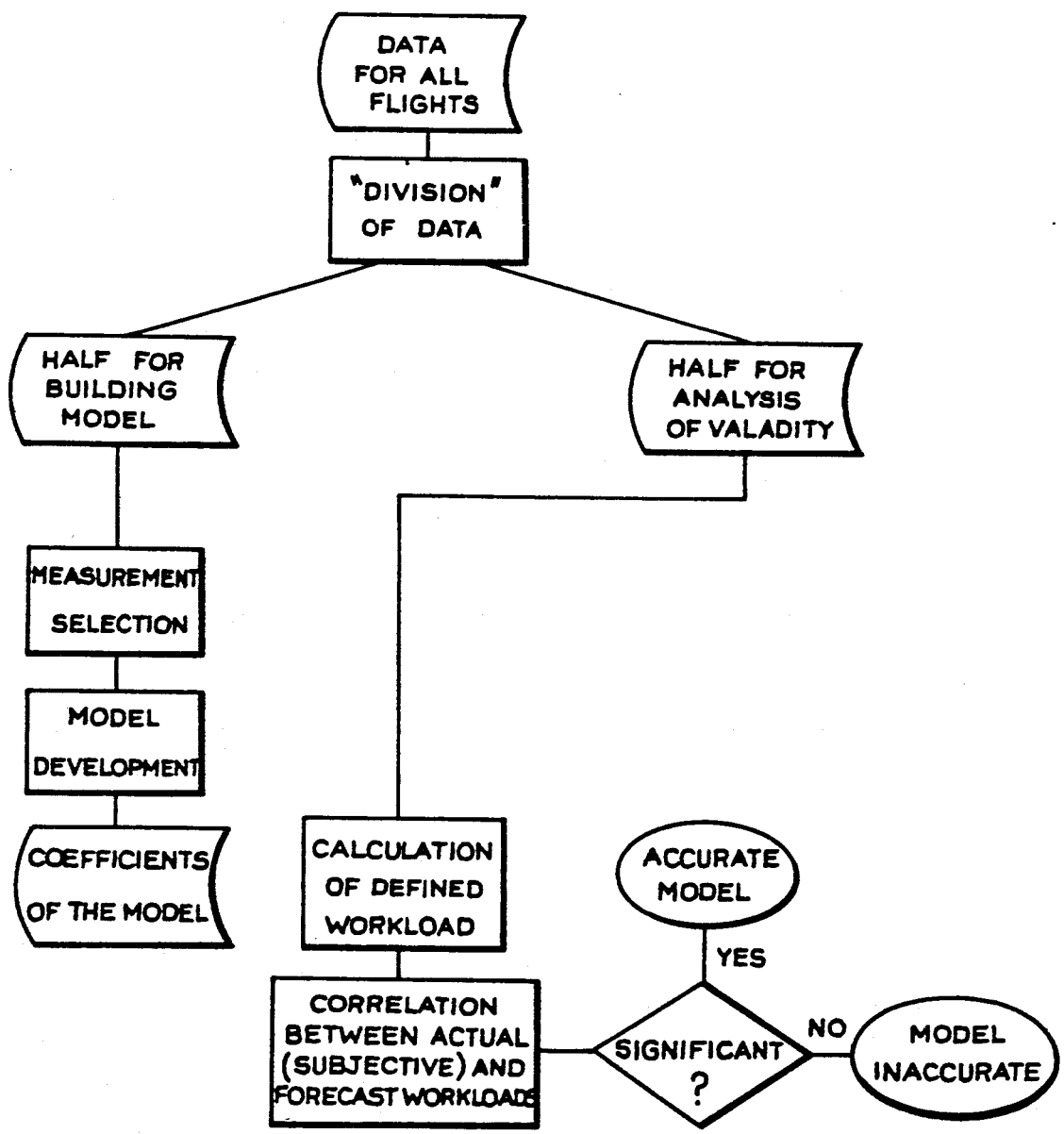
FIG. 10 is a flow, chart showing validation of the model according to the invention based on the "divided halves" method.
Figure 13:
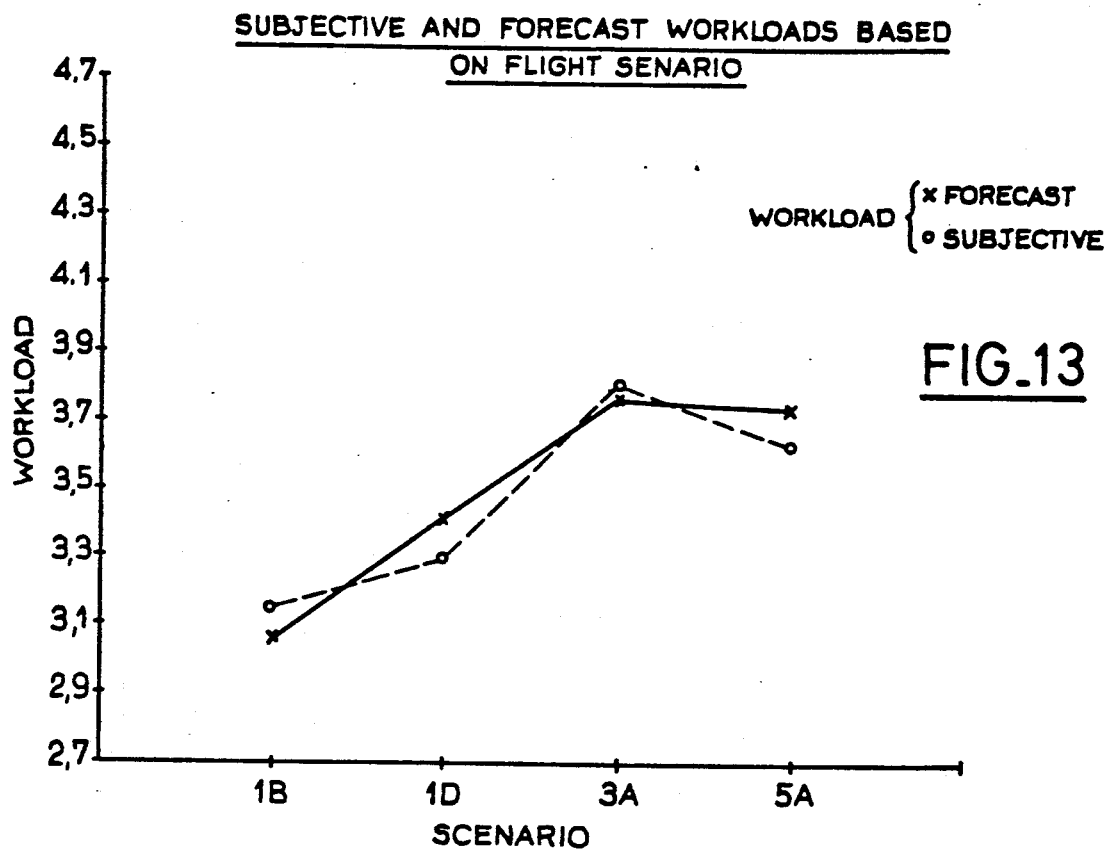
Figure 14:
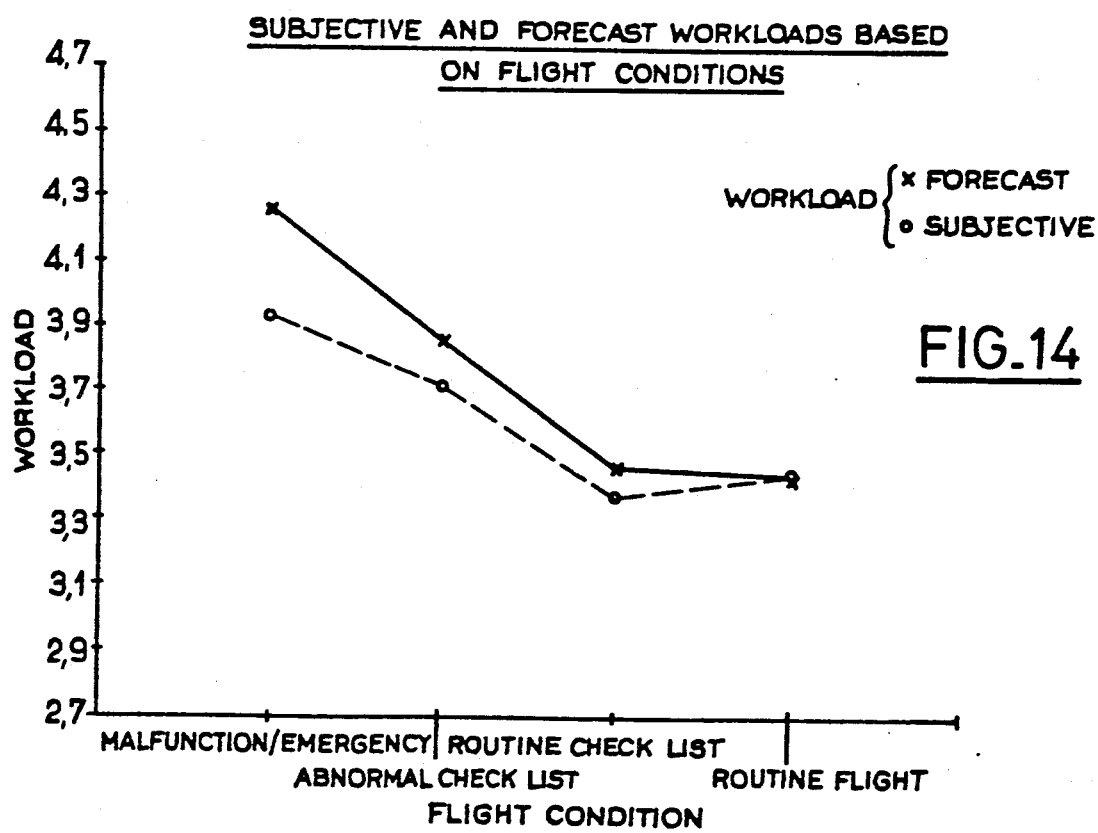
Figure 15:
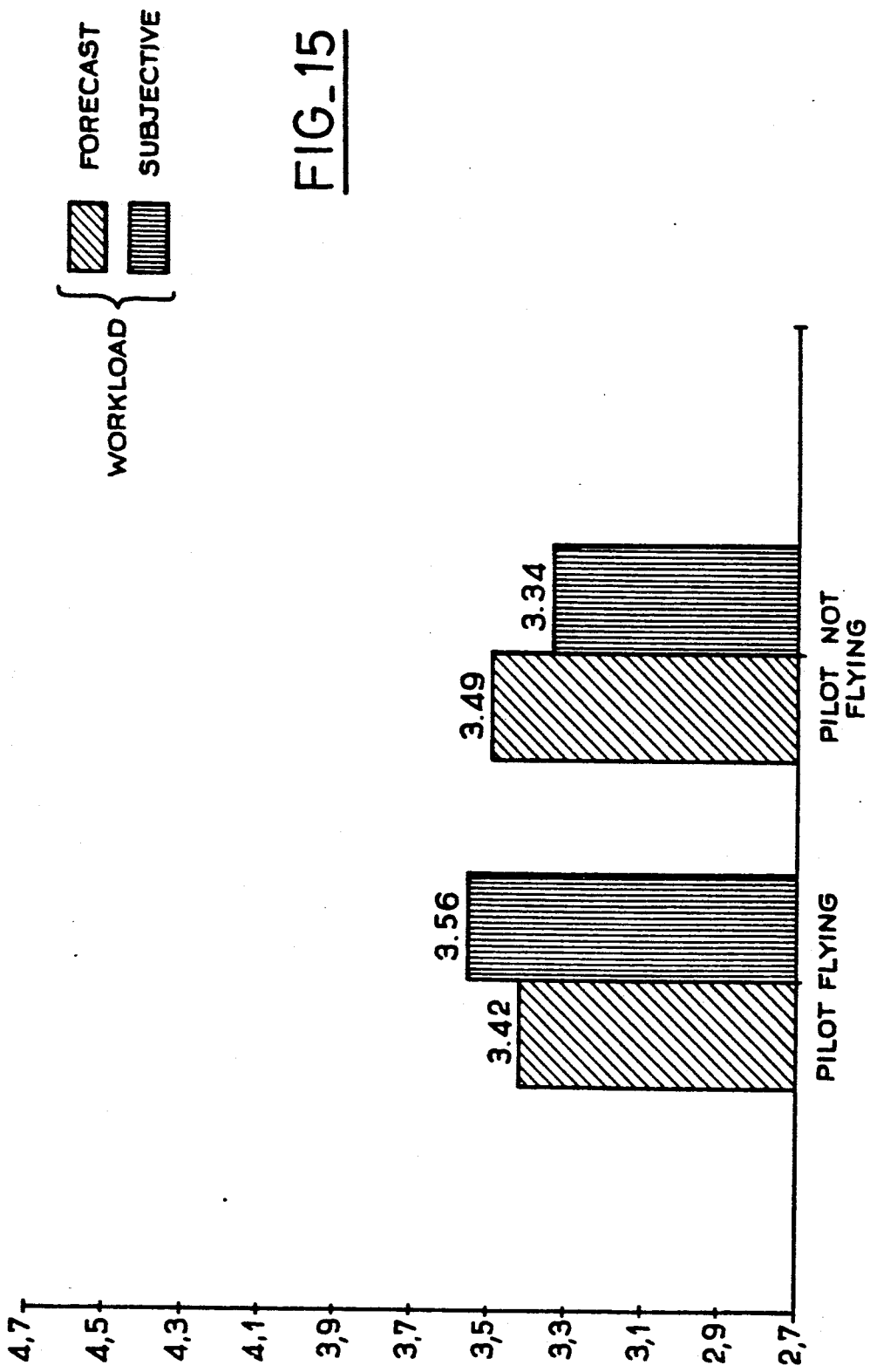

Tables I to VI which are inserted in the memorandum of disclosure shall be considered to be an integral part of this disclosure together with the legends shown on the flow charts of FIGS. 1, 9 and 10.

This disclosure, which is provided as a non-limiting example, shall more specifically describe a process for developing a model to forecast the workload of a pilot of a commercial aircraft such as the AIRBUS A 310. In the detailed description of the invention which shall now be presented and which shall refer to the drawings and tables, a description of the nature and the method of entering the data used for developing the model shall first be provided, followed by a description of the measurements or variables derived from these data. The same procedure shall be observed for each data set concerned.

The procedure for obtaining aircraft type approval for an aircraft of the aforesaid type implies undertaking a large number of test flights which are more particularly designed to determine whether the subjective mental workload imposed on its pilots (pilot and copilot) while flying this new aircraft is acceptable. During these flights, the crew is asked to rate its workload at predetermined instants, using a predefined scale.

Because these test flights involve a lengthy and expensive process, the Applicant has decided to develop a mathematical model which is capable of forecasting the pilot ratings in a reliable and objective manner.

The first step in the development process for a model of the aforesaid type is to determine whether there exists a statistical correlation between the ratings provided by the pilots during the flight and certain aircraft performance parameters which are directly quantifiable. In a preliminary study conducted by the Applicant, the existence of such a correlation was established.

The next step involves compilation of sufficient data and calculation of the model using appropriate statistical techniques.

In the example, this second step was implemented using data compiled during the approval procedure for the AIRBUS A 310-200 aircraft. Indeed, these data form an excellent basis for developing the model. Thus the 60 flights of the A 310 certification trials provide an abundance of data including subjective workload ratings, aircraft performance measurements (hereinafter referred to as aircraft data) and heart rate records (electrocardiograms) for the 14 pilots who participated in these trials. Thus, as shall be described below, variables denoting aircraft and physiological data which may be related to the workload may be calculated. In addition, the flight scenarios used during the A 310 procedure cover a relatively broad range of routine, abnormal and emergency flight conditions which may be considered to form a representative range of situations that a significant model must be able to predict. The data were compiled by following the procedure indicated in FIG. 1. More specifically, for each certification flight considered, each aircraft pilot, under defined flying conditions and flight conditions and stages, which constitute the flight parameters, is asked to provide a rating of his workload using a predefined scale which shall be described below; this rating is logged at the same time as the corresponding flight parameters, and, simultaneously, the values of significant data of the said flight parameters are measured, and, finally, a statistical correlation is established between the workload ratings values on the one part and the aforesaid data and flight parameters on the other part.

The preferred model of the invention, selected on the basis of its statistical strength and of practical considerations, employs the aircraft data and the heart rate information of the two flight crew members (pilot and copilot). A model was also developed based on flight data alone because—right or wrong—measuring heart rates in flight may be considered to be an added burden while flying. This simplified model, which shall be described further on, constitutes a reasonable alternative in situations wherein the recording or the use of heart rate data is impractical. However, its forecasting capacities are substantially inferior to those of a model employing both aircraft and heart rate data.

In the process illustrated in FIGS. 1 and 9, four distinct sets of data are synchronized and merged to create the final measurements used in building the model. Three of these data sets are provided on a magnetic medium. These are the pilot ratings and observations made by an on-board observer on the flight stages and flight conditions, the aircraft flight data and the pilot heart rate data. The fourth set of data comprises flight logs which are printed during the various flights and which indicate the flight stages (ascent, cruising, descent, etc.) and the flight conditions (routine, emergency, etc.). Each data set shall now be described in detail, in reference to FIG. 2 with respect to means of data entry.

NATURE AND ENTRY OF WORKLOAD RATING DATA

In evaluating their workloads, the pilots used the following scale:
2 Light workload; ample reserve capacity; highly acceptable;
3 Moderate workload; more than adequate reserve capacity; fully acceptable;
4 Normal workload; adequate reserve capacity; acceptable;
5 Significant workload; diminished/reduced reserve capacity; high but acceptable;
6 Heavy workload; low reserve capacity; barely acceptable;
7 Extremely heavy workload; nearly no reserve capacity; not acceptable on an ongoing basis.

The aforesaid scale may be further defined as follows:
2: All pilot tasks are accomplished without delay;
3: Certain tasks may be interrupted;
4: Regular interruptions of tasks which the pilot can handle without unreasonable effort;
5: Interference with desirable tasks; repeated interruptions of tasks and/or pronounced stress or mental effort levels;
6: Workload greater than the pilot can handle on an ongoing basis; frequent interruptions of tasks and/or accentuated stress or mental effort levels;
7: Tasks continually interrupted and/or highly accentuated stress or mental effort levels; high risk of error or omission.

In order to rate his workload during flight using the aforesaid scale, each pilot is supplied with a panel 1 (see FIGS. 2, 4 and 5) positioned in front of him within easy reach on the instrument panel 9 of the cockpit. Each pilot panel 1 displays on its front six impulse pushbuttons 1a numbered from 2 to 7 for the rating and a display 1b which lights up when the pilot is asked for a rating. Each panel 1 is electrically connected (see FIG. 2) to an observer notation panel 2, a front view of which is provided in FIG. 3A. This observer panel 2 may, for example, be installed in the cockpit within easy reach of the on-board observe. This panel 2 displays on its front a start/stop inverter switch 3, a two-digit digital display 4 and sixteen pushbuttons 5 respectively labeled E (erasure), CM1 (crew member 1 occupying the pilot's seat on the left), CM2 (crew member 2 occupying the copilot's seat on the right), CS, DR, R, DEC, M, C, DES, AP, AT, N, NC, PU, CU. Pushbutton E is an illuminated switch with a built-in light indicator.

Switch 3 is used to supply power to panels 1 and 2, to reset display 4 to zero and for resetting to zero in general. The pushbutton labeled E (erasure) is turned on when switches CM1 or CM2 are depressed, which signifies that one of the two pilots has been asked to supply a rating. In this instance, indicator 1b of corresponding pilot panel 1 is lit then extinguished once the pilot has depressed one of the rating switches 1a Switch E of panel 2 also lights up when switch CS is depressed (flight condition only).

It is extinguished:

5 seconds after the pilot indicator light 1b is extinguished if a rating is requested (or 5 seconds after the last command given by the observer if it is last in the sequence);

5 seconds after the last command given by the observer if no rating is requested;

whenever it is depressed.

The 5 second time delay may be adjusted (from 2 seconds/minimum to 10 seconds/maximum).

Digital display 4 is incremented when switches CM1, CM2 or CS are depressed and is reset by inverter switch 3. When impulse pushbutton CS is depressed, it generates a "pilot not tested" message without illuminating indicators 1b of PILOT or COPILOT panels 1 and denotes a flight stage and flight condition change with no rating supplied by the pilot or copilot. The sequence continues by controls of the flight stage and flight condition pushbuttons (see FIG. 3).

The "flight stage" pushbuttons, by any appropriate known conventional means, control the generation of a code, which may be binary, for example, having a value from 0 to 7, in accordance with the following correspondence:

0 for switch DR (go around or rapid descent);
1 for switch R (taxiing prior to takeoff);
2 for switch DEC (takeoff);
3 for switch M (ascent);
4 for switch C (cruising);
5 for switch DES (descent);
6 for switch AP (approach)
7 for switch AT (landing).

The "flight condition" pushbuttons control the generation of a code having a value ranging from 0 to 3 and corresponding to the following:
0: normal (switch N)
1: routine check list (switch NC)
2: malfunction—emergency (switch PU)
3: emergency verification check list (switch CU).

Switch N is not connected. It is provided so that each time an observation is made, the observer may depress a pushbutton 5 from the three categories listed above.

As shown in FIG. 2, the pilot panel 1 and observer panel 2 are electrically connected to a logic processing board 6 which, in conjunction with a recorder 7 and a clock 8 which defines a reference time base common to the various measurement means of the aircraft (GMT time), provides for centralized storage for the pilot ratings and the observer notations. Board 6 receives 28V direct current from the aircraft power supply and supplies power to panels 1 and 2. It additionally generates logic signals representing the aforesaid ratings and notations which are applied to signal acquisition board 7a of recorder 7. Board 6 outputs its signals in parallel form to 23 "all or none" outputs 6a. As shall be described further on, board 6 is also connected to an onboard video monitoring system used to log the flight parameters.

Alternatively, the observer may employ a panel 2, a front view of which is illustrated in FIG. 3b. More specifically, this panel is designed to verify the acceptability of ratings supplied by the pilots Like the panel of FIG. 3A, it comprises an inverter switch 3, three pushbuttons 5 respectively labeled E, CM1 and CM2 and a display 4 having functions identical to the elements described in the foregoing. Panel 2 of FIG. 3B also comprises six pushbuttons 5 labeled 2 to 7, three pushbuttons 5b labeled M, I and S and a light indicator 2a.

Throughout the duration of the flight, using the aforementioned panel 2, the observer records his own assessments of the respective workloads of the two flight crew members, using pushbuttons 5 numbered from 2 to 7. The observer proceeds in this manner at the end of each stage or sub-stage of the flight, or each time he detects a change in the workload of either pilot. He also provides a rating whenever indicator 2a is illuminated, which indicates that one of the two crew members has, on his part, supplied a rating. The observer may also log pilot errors using switches M, I and S as follows:

M: minor error
I: significant error such as corrected or non corrected abnormality or non corrected error not related to flight safety;
S: error affecting safety, whether corrected or non corrected.

In order to fulfill his functions as efficiently as possible, the observer must be a pilot in his own right and be completely familiar with the ratings scale used and with the differences between operational, monitoring and planning tasks.

VARIABLE DERIVED FROM THE RATINGS DATA

A study of ratings supplied by pilots has highlighted significant disparities in the distribution of those ratings as a function of the pilot under consideration. The significance of variations from pilot to pilot in the use of the ratings scale makes it necessary to interpret these ratings in a manner which eliminates external variations caused by the pilot's interpretation of the ratings scale. The following transformation relationship has been proposed in the works of Gopher and Braune (1984) on the psychophysics of workloads:

$$T = \text{Log}_{10}\left(\frac{P - P_{min} - 1}{P_{max} - P_{min}}\right) \text{ wherein}$$

T is the transformed rating,
P is the raw rating,
Pmin is the lowest rating supplied by a pilot during all of the test flights,
Pmax is the highest rating supplied by the said pilot during the same flights.

The transformation of raw ratings according to Gopher and Braune displays at least two advantages. On the one hand, the acceptability of the model developed using available data is improved. On the other hand, "parasitic" variations caused by variations in ratings from pilot to pilot are eliminated. In addition, given the entire set of ratings compiled for all of the pilots, the value of Pmin may be established as equal to 2. A third advantage of the transformed rating is that it may be considered to be a new index of the performance of the pilot-aircraft system having an application which is broader in scope than that of the scale employed for the rating. However, the "smoothing" effect of the aforesaid transformation results in a certain ambiguity if one seeks to express the predetermined or calculated workload in accordance with the scale from 2 to 7. The following relationship has consequently been adopted:

$$PRi = (10^{Y_i}) \times R + 1$$

wherein:
PRi is the predetermined rating based on the scale from 2 to 7;
Yi is the predetermined transformed rating, that is, the calculated rating;
R is the rating range of the pilot under consideration.

In order to obtain a relationship which is applicable to all pilots, a value of R equal to 3 is assumed, which leads to the following relationship:

$$PRi = 3 \times 10^{Y_i} + 1$$

COMPUTER PROCESSING OF RATINGS DATA

The pilot ratings and observer notations, sorted into files (one file per flight), are recorded on magnetic tape in binary form on the recorder 7, at the rate of 25 data per second. These data are subjected to preliminary processing by a (not shown), in accordance with the flow chart shown in FIG. 16, in order to determine the moment at which this rating was supplied, the value of the rating, the pilot who supplied the rating (CM1 or CM2) and the corresponding flight condition and flight stage. One "ratings" file per flight is thus obtained.

Each of the aforesaid files is downloaded from the central processing unit of the computer used in the said preliminary processing, to a microcomputer (not shown) for further processing in accordance with the flow chart in FIG. 17

The aforesaid microcomputer is programmed to introduce specific information on a given flight, that is, in this example:

the flight condition: malfunction/emergency, malfunction check list, routine check list, routine flight;

the flight stage: go around or emergency descent, pre-flight, taxiing prior to takeoff, takeoff, ascent, cruising, descent, approach, landing, taxiing post landing;

the pilot's role: pilot CM1 (that is pilot occupying the pilot's seat on the left of the cockpit) at the aircraft controls, pilot CM1 not flying, pilot CM2 (occupying the copilot's seat or seat on the right the cockpit) at the controls, pilot CM2 not flying;

the number of ECAM systems engaged, that is, the number of electronic central aircraft management systems (ECAM) operating at the moment of the rating;

the number of FMS systems engaged, that is, the number of flight management systems (FMS) operating at the time of the rating;

the status (engaged or disengaged) of the automatic thrust lever, that is, the thrust lever which automatically adjusts engine power.

These parameters are supplied in part by the notations of the observer in the cockpit and partly by the notations logged by one or more observers in the cabin during test flights.

The aforesaid microcomputer is also programmed to display each individual rating at the instant it is supplied and to identify the pilot who supplied it. The time of the rating is then compared to the notations of observers in the cabin, called observation data. These observation data are preferably encoded using a four-digit code. This code is shown in Table I below.

TABLE I

Four-digit Code

The first digit is used to identify four situations:
0: malfunction
1: malfunction check list
2: routine check list
4: routine flight When the first digit is equal to 2, the sequence observed is a routine check list. The two subsequent numbers are used to identify the type of check list, or another pilot task:
01: flight deck check-out
02: pilot briefing
03: pre-startup
04: post-startup
05: taxiing
06: pre-takeoff
07: post-takeoff
08: descent
09: approach
10: landing
11: post-landing
20: navigation
30: radio communications If the first digit is equal to zero, the sequence observed corresponds to a flight incident or to a malfunction; if it is equal to 1, the sequence observed corresponds to the check list, or to the procedure relating to the malfunction or incident. In these two cases, the two following digits identify the type or sub-type of incident or malfunction.
1: Electrical power unit (APU)
  1: engine fire or serious damage
  2: APU on fire
  3: two engines on fire
  4: automatic thrust lever malfunction
  5: low oil pressure
  6: engine warning or mandatory shutoff
  7: one engine on fire
  8: engine malfunction
2: Fuel system
  1: fuel supply without pump
  2: malfunction of inboard or outboard fuel pumps
  3: single malfunction of main fuel pump
  4: dual malfunction of main fuel pump
  5: automatic pump transfer system malfunction
3: Electrical system
  1: smoke in flight control panel
  2: smoke in main instrument panel (phase 1)
  3: smoke in batteries
  4: smoke in cockpit equipment
  5: one generator disabled
  6: both generators disabled
  9: smoke in main instrument panel (phase 2)
4: Hydraulic system
  2: loss of hydraulic fluid
  3: other malfunction
5: Flight controls
  1: detection of jammed or asymmetrical flaps
6: Landing gear
  1: landing gear normal
  2: other malfunction
7: Pressure system
  1: miscellaneous engine or APU malfunctions
  2: other malfunction
8: Air conditioning and pressurization system
  1: malfunction in cargo compartment
  2: other malfunction
9: Miscellaneous
  1: structural problem
  2: autopilot malfunction
  3: other malfunction The fourth digit identifies the flight stage or aircraft check-out stage:
0: check-out
1: pre-flight
2: taxiing prior to takeoff
3: takeoff
4: ascent
5: cruising
6: descent
7: approach
8: landing
9: taxiing post landing Certain codes identify flight sequences or highly specific events, such as:
4030: forced landing
4040: difficult flight
4050: emergency descent
4060: landing under overload conditions
4070: go around 4081: CM1 disabled
4082: CM2 disabled The observation data are periodically recorded during the flights and include information relating to the flight stage, to the flight conditions and to the location and nature of any malfunction or emergency situation. The aforesaid rating instants and observation data are then manually synchronized and the appropriate code is entered for each rating. The ratings files are then reloaded into the computer's central processing unit for processing by the main processing program which shall be described further on.

FLIGHT PARAMETER DATA ENTRY

To record the observation data, the observers in the cabin use an on-board closed-circuit television monitor schematically represented in FIG. 2. This system substantially comprises a color television monitor 10 which is connected, on the one part, to a first camera 11 through a video mixing device 12 and a camera control unit 11a and, on the other part to a video overlay device 13 which is in turn connected to the previously described logic processing board 6. Camera 11 is a wide angle camera which films the pilot positions in the cockpit while the overlay device 13 displays on monitor 10, as an image superimposed on camera image 11, the workload ratings and/or the observation data output respectively by the pilot panel 1 and observer panel 2 through board 6.

Observers in the cabin may thus make notes on the pilot ratings so that these may be verified at a later time, and notes on the flight parameters supplied by the observer, while comparing these to the information supplied by camera 11 on monitor 10.

Video mixer 12 is also connected to a videocassette recorder 14, which is in turn connected to a second camera 15 through a second video overlay device 16 and a camera control unit 15a. Camera 15 shall, for example, film images of the top panel and the central instrument console which may be recorded by videocassette recorder 14 and/or displayed on monitor 10 at the same time as the flight deck images, through mixer 12. In addition, overlay device 16 which is also connected to aircraft reference clock 8 provides for recording and/or superimposed display of GMT time. The on-board closed-circuit television system is controlled from a control position 17 installed in the cabin and comprising a videocassette recorder control 17a which is connected to videocassette recorder 14 and a camera selection control unit 17b which is connected to video mixer 12.

NATURE AND ENTRY OF AIRCRAFT DATA—MEASUREMENTS DERIVED THEREFROM

The aircraft data recorded during the aforesaid test flights, on magnetic tape, for example, using a recorder 18 synchronized with reference clock 8, comprise 22 flight data and 22 automatic flight control data. For these latter data, the significant data are the control "engaged" or "disengaged" information at the instant the flight data are measured. The aforesaid data are identified in Table II, below.

TABLE II

| DATA No. | AIRCRAFT DATA | UNIT | RANGE |
| --- | --- | --- | --- |
| 1 | Flight computer control: pitch | Degrees | +/− 180 |
| 2 | Flight computer control: roll | Degrees | +/− 180 |
| 3 | Angle of left elevator | Degrees | +/− 180 |
| 4 | Angle of rudder | Degrees | +/− 180 |
| 5 | Flap position | Degrees | 0 to 41 |
| 6 | Angle of left aileron | Degrees | +/− 180 |
| 7 | Angle of right aileron | Degrees | +/− 180 |
| 8 | Angle of pitch | Degrees | +/− 180 |
| 9 | Angle of roll | Degrees | +/− 180 |
| 10 | Pitch speed (fuselage) | Degrees/sec | +/− 128 |
| 11 | Roll speed (fuselage) | Degrees/sec | +/− 128 |
| 12 | Vertical speed (barometric) | Feet/min | +/− 15000 |
| 13 | Aerodynamic speed | Knots | 15 to 450 |
| 14 | Angle of horizontal stabilizer | Degrees | +/− 180 |
| 15 | Angle of incidence | Degrees | +/− 60 |
| 16 | Longitudinal acceleration (Earth) | g | +/− 0.5 |
| 17 | Vertical acceleration (Earth) | g | −0.5 to 2.5 |
| 18 | Barometric altitude (Std) | Feet | −1000 to +50000 |
| 19 | Speed N1 of engine 1 | rpm | 0 to 4400 |
| 20 | Speed N1 of engine 2 | rpm | 0 to 4400 |
| 21 | Angle of thrust lever (Engine 1) | Degrees | 15 to 87.5 |
| 22 | Angle of thrust lever (Engine 2) | Degrees | 15 to 87.5 |
| DATA No. | DATA (AUTOMATIC FLIGHT CONTROLS) | | |
| 23 | Altitude | | |
| 24 | Vertical speed (V$_z$) | | |
| 25 | Flare-out | | |
| 26 | Take-off controls (go around) | | |
| 27 | Take-off controls (take-off) | | |
| 28 | Level change | | |
| 29 | Radio guidance system (glide slope) | | |
| 30 | Longitudinal modes-following | | |
| 31 | Longitudinal modes-capture | | |
| 32 | Navigation | | |
| 33 | Course maintenance | | |
| 34 | Course selection | | |
| 35 | Radio guided azimuth (localizer) | | |
| 36 | Taxiing | | |
| 37 | Take-off (Lacet) | | |
| 38 | Taxiing (go around) | | |
| 39 | Lateral modes-capture | | |

TABLE II-continued

| | |
|---|---|
| 40 | VOR |
| 41 | Lateral modes-following |
| 42 | Alignment |
| 43 | Transparent Piloting Engine Conditioning |
| 44 | Engine Conditioning Control |

The significant ranges and units for the flight data are also indicated in Table II. In developing the model according to the invention, the following flight data were selected the angle of roll, the aerodynamic speed, the angle of incidence, the speed N1 of engine 1, the rudder angle and the roll speed.

However, the raw data are not used in developing the model for at least two reasons. On the one part, the raw or instantaneous value of most of the data at the instant of a rating by a pilot may not reflect an exact representation of the datum to be taken into account and, on the other part, experience has shown that pilots tended to base their instantaneous ratings on a set of impressions incorporated over a certain time period.

Based on these observations, it was decided to "smooth out" the data using the method of exponential smoothing.

In exponential smoothing, progressively lower weights are assigned to the values of data as they age. The weighting of past values is exponential, such that the significance of each successive preceding value is reduced by the same ratio. The general formula for exponential smoothing with a time constant T (second) is:

$$A0 = A1 + \frac{DT}{T}(S0 - A1) \text{ wherein:}$$

wherein:

A0 is the value of the calculated exponential average;
A1 is the preceding value of the exponential average;
DT is the solution interval, that is, the time interval between the successive data points (which is one second for aircraft data and the real interval RR for heart rate data as shall be described further on);
T is the time constant or the smoothing factor of the average in seconds;
S0 is the value of the data at time 0, that is, the value which corresponds to the rating.

By weighting the most recent data more heavily, exponential smoothing provides a measurement which is more sensitive to recent events while also reflecting the effects of events that occurred in the more distant past. These averages are easy to calculate because each new value depends only on the present value of the measurement and on the preceding value of the mean. They have proven to be excellent means of forecasting pilot workload ratings in the preliminary study conducted by the Applicant Depending on the situation, the values selected for T are 8, 32, 64 and 128 seconds.

In addition, to calculate exponential averages, the absolute value of certain data is preferably used. For example, for the rudder angle, which may assume positive and negative values, it is preferable to relate to the workload the absolute range of the value deviation from the nominal value.

Exponential smoothing is also applied to variables such as the rates of transition through zero, the rate of inversions or the decimal logarithm of certain data.

Thus, for data which may assume both positive and negative values and for which zero constitutes the nominal value (for example, the angle of roll or the roll speed), this rate is calculated by comparing the sign of the instantaneous value with the sign of the value which immediately precedes it. If these two signs are the same, a value of zero is introduced in the corresponding exponential average and if they are opposite, a value of 60 is introduced into the said exponential average to indicate a value of 60 transitions per minute.

The rate of inversions is the number of inversions per minute introduced in an exponential average. An inversion is defined as a change in the direction of a datum value compared with the two preceding values of this datum.

For example, the series of values 1-2-3 or 7-4-1 do not display an inversion while the series 20-10-11 does.

In developing the model, there was also introduced the decimal logarithm of the number of automatic flight controls engaged at the instant of the rating (see Table II). The assumption adopted is that a pilot's workload is inversely proportional to the assistance provided to this pilot by the automatic flight control system and that this degree of assistance can be evaluated by the number of controls engaged.

NATURE AND ENTRY OF PHYSIOLOGICAL DATA

According to a preferred or improved embodiment of the invention, in developing the model, physiological data relating to the two pilots of the tested aircraft are taken into account.

Physiological or heart data are recorded on magnetic tape in the form of sequential heartbeats or periods (intervals RR) recorded in synchronization with a 480 Hz clock. For this purpose, a battery-operated magnetic tape cassette recorder 19 is used (see FIG. 2), wherein one channel serves to record the electrocardiogram (EKG) of pilot 20, that is, the voltage between two electrodes 19a and 19b affixed to the skin of this pilot along a derivative identified as CM5 (wherein said derivative is approximately oriented along the main axis of the heart). An electrode 19a is placed at the level of the main manubrium 21 (upper part of the sternum) of pilot 20 and the other electrode 19b is placed across from the left edge of the thoracic cage, at the level of the sixth rib.

At the same time, another channel is used to record a signal having a frequency of 480 Hz generated by a quartz clock. On this same channel is recorded a time index, introduced by an observer by means of an appropriate switch, to record the starting time of the EKG. The observer, using a chronometer, maintains a record of events which breaks down pilot activity into a series of time segments or sequences, each of which constitutes a defined stage or event in his activity, designated by the predefined code described in the foregoing.

Figure 6:
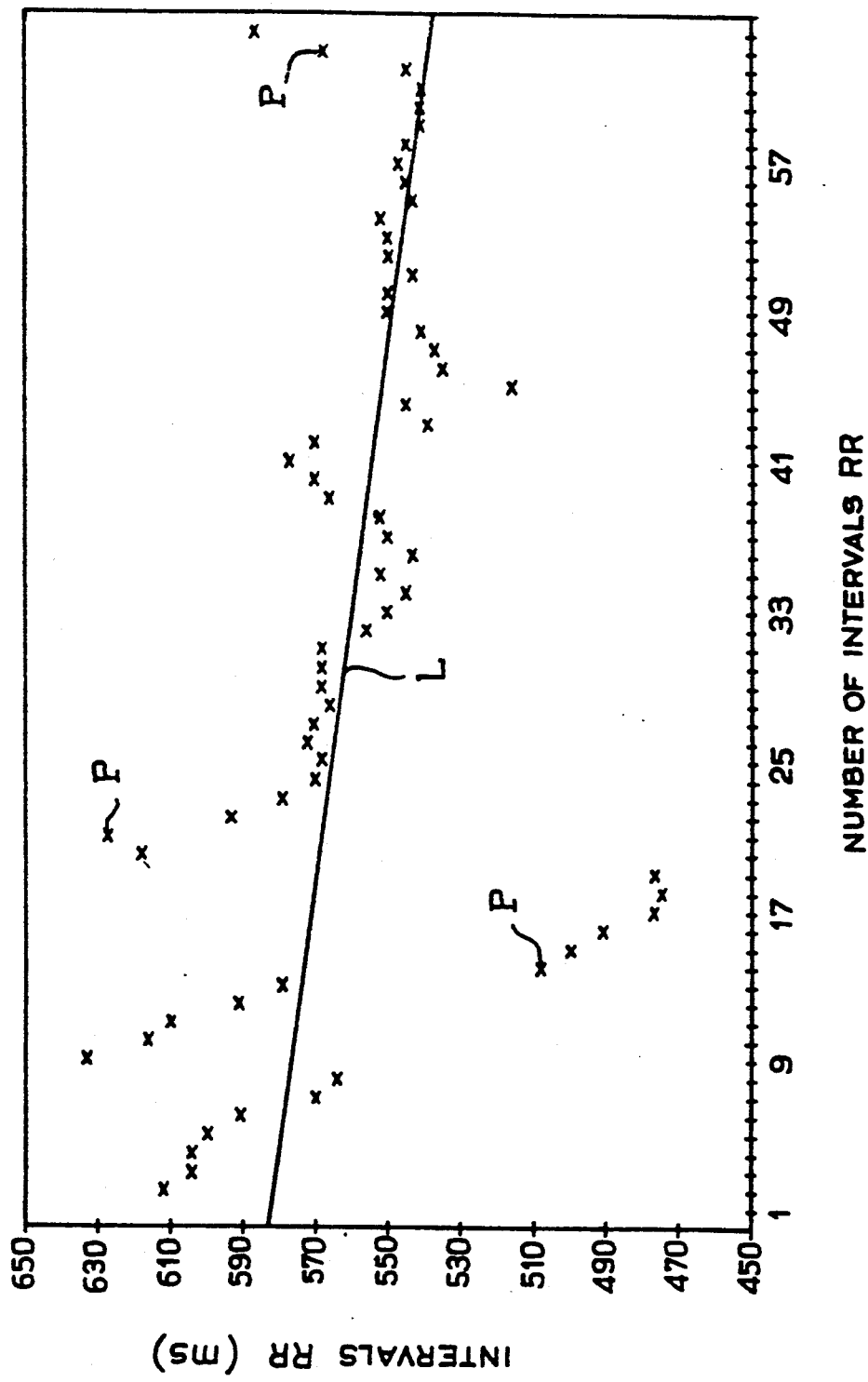
FIG. 6 is a curve showing the graph of a crew member electrocardiogram.

The electrocardiogram is formed of a series of curves, each corresponding to one cardiac cycle, and formed of successive segments designated in a conventional manner by the letters PQRST (see FIG. 6). More specifically, the QRS compound corresponds to ventricular contraction (systoles) and comprises a peak R which is easily detected. Preliminary computer processing of the recorded data serves to identify the peaks of successive waves R and to measure the time intervals between these as illustrated in the flow chart of FIG. 18.

The data are first read, then sorted according to the successive sequences specified in the events file. For each sequence, the following information is provided:

Identification of the sequence by its code and the real time at the start of the sequence, the relative time at the start of the overall observation procedure and the duration of the sequence;

Heart rate (HR) curve calculated in 5 by 5 second intervals (as the inverse of the mean duration of intervals RR falling within this 5 second interval);

Histogram of intervals RR: More specifically, this histogram is displayed according to 24 categories of HR (from 10 to 240 heartbeats/minute) and, in each category, provides the number of QRS compounds detected, or an estimate of the time during which the pilot maintained it.

Figure 7:
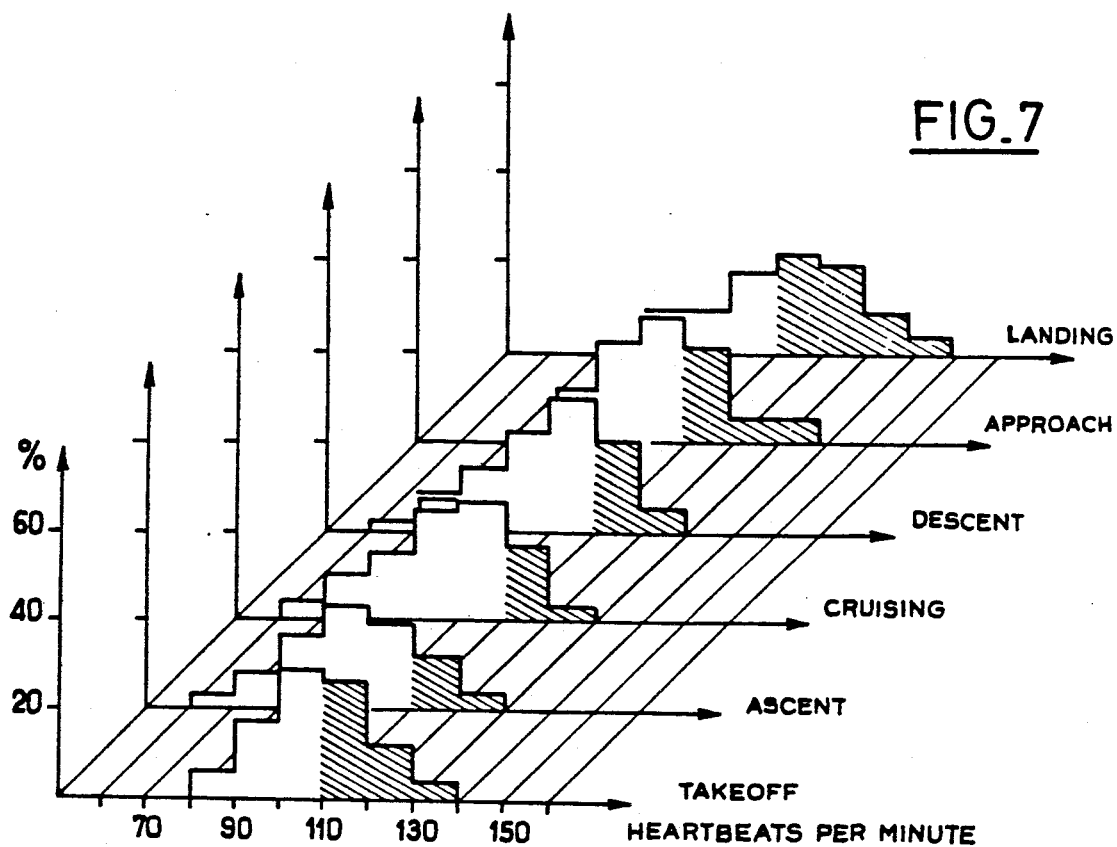
FIG. 7 and FIG. 8 are histograms showing the heart rate fluctuations of the crew members for each flight stage.
Figure 8:
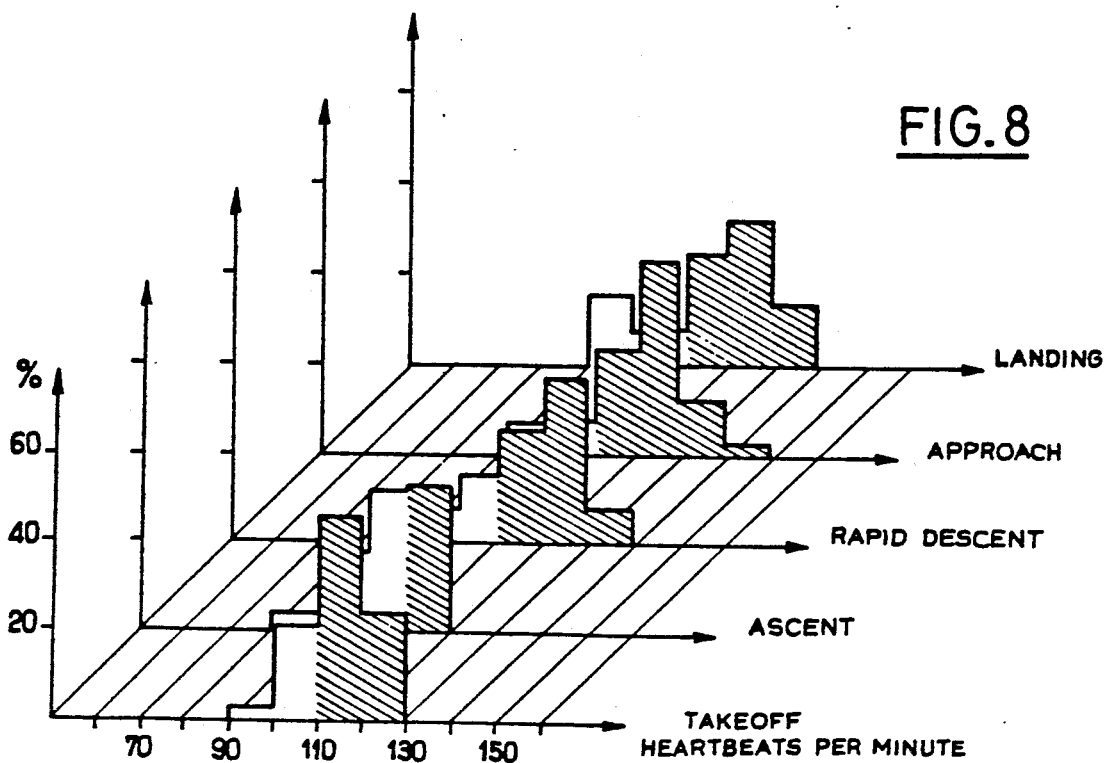

FIG. 7 and FIG. 8 represent two examples of histograms for a given population of tested pilots (pilots flying the aircraft); these provide for an evaluation of the evolution of the heart rates of these pilots as a function of the flight stage and, by the same token, demonstrate the advantage of introducing this factor in developing the model according to the invention.

In FIG. 7. and FIG. 8, the shaded areas correspond to a number of heartbeats per minute which is greater than or equal to 110, which is a typical value in this field. In the curves under consideration, the ordinate shows the percentage of pilots having values of heartbeats/minute shown along the abscissa.

MEASUREMENTS OR VARIABLES RESULTING FROM PHYSIOLOGICAL DATA

In developing the model, the following variables derived from the aforesaid electrocardiogram measurements are employed:

Raw interval RR with exponential smoothing as described in the foregoing;

Differential values: two differential values calculated on the basis of the deviation of interval RR from the rectilinear linear mean of the 16 or 32 preceding intervals RR. This supplies a type of measurements of movements over 16 and 32 heartbeats. The exponential averages then smooth out these movements in order to eliminate aberrations to a certain extent. By using this smoothing method, the impact of a single abnormally low or high cardiac cycle which would be isolated after an initial screening will be diminished to some extent as a function of the specific time constant employed in the average.

Average value: In addition to being used to create differential values, the averages of the 16 or 32 heartbeats display a certain advantage even if they are not introduced in the exponential averages. The averaging of the 16 or 32 heartbeats preceding a defined rating period is deemed to provide adequate smoothing. In addition, these averages, as pure linear averages, are considered to be a reasonable measurement of the short term range of the heart rate immediately preceding the rating period.

Deviation from the reference mean: the mean and standard deviation for the basic conditions of each flight (2 minutes after takeoff) is calculated during the preliminary processing in accordance with the data processing procedure illustrated in the aforesaid "physiological data" flow chart. This measurement represents a set of exponential averages based on the subtraction of interval RR from the average acceleration of the heart rate of each pilot during events occurring during a relatively calm flight period. Individual RR intervals are subtracted from the reference mean such that the positive values of the measurement will identify heart rates that are more rapid than the base rates (shorter RR intervals).

Reference weight: the deviation from the reference mean does not take into account the magnitude of the standard deviation from the reference mean. If the standard deviation from the reference mean is substantial, relatively large deviations relative to the reference mean may not prove to be significant. Conversely, if the standard deviation from the reference mean is low, more importance must be placed on deviation of intervals RR from the reference mean. To explain the standard deviation relative to the base (SD) and the mean (M), the following variables are computed in the following manner before they are used in exponential averages.

$$B1 = \frac{M - SD \times DBL}{M + SD} \text{ reference weight sigma 1}$$

$$B2 = \frac{M - 2SD \times DBL}{M + 2SD} \text{ reference weight sigma 2}$$

wherein:

B1 is the value of the measurement;
DBL is the deviation from the reference mean M;
SD is the standard deviation from the reference mean and 2 SD is twice the standard deviation from this reference mean.

Regression residuals: a linear regression line displays the minimum least squares adapted to a data set. The residuals of a regression line represent the deviations squared of the real points emerging from the graphed line. As such, their sum is a pure measurement of the short-term variation which is influenced by no short or long term linear movement These residuals must simply measure the extent of short term heart rate fluctuations preceding the instant of the rating. The residuals from the regression line of the 64 heartbeats immediately preceding a defined rating instant and the 32 first heartbeats of the 64 heartbeats preceding this instant are used as the variables. FIG. 6A represents a set of 64 intervals RR and a graph of a regression line. The residual measurement of the 64 heartbeats as it is used in building the model is the sum of the distances squared of the real data points over intervals RR relative to the graphed regression line.

In FIG. 6A, graphed regression line L shows a downward movement, that is, a movement toward an accelerated heart rate (shorter interval RR). The significance of this movement is measured by the coefficient of the regression equation. This coefficient is defined by the slope of regression line L. Because the movement over the 32 and 64 heartbeats used for the calculations of the residuals is also of interest, the regression coefficients are used as measurements as well. It is important to note that the magnitude of the regression residuals is not in any way related to the movement or slope of the regression line. The graph shown in FIG. 6A may be rotated 360°, thus causing a continuous change in the slope of the line (regression coefficient) without any effect on the sum of the distances squared of individual points P relative to the regression line.

The variables derived from aircraft data and the pilot EKG measurements and employed in developing the model are listed in table IIIa below. In this table, "tested pilot" signifies that the measurement was made for the pilot supplying a rating and "non tested pilot" means that the measurement was made for the pilot not supplying a rating.

TABLE IIIa

Variable $X_{ij}$

Decimal logarithm of the angle of roll (128)**
Rate of inversions of aerodynamic speed (64)
Rate of inversions of angle of incidence (64)
Rate of inversions of speed N1 of engine 1 (128)
Speed N1 of engine N1 (128)
Decimal logarithm of rudder angle (32)
Rate of transitions through zero of the angle of pitch squared (128)***
Decimal logarithm of the number of automatic flight controls engaged (I)
Rate of transitions through zero of roll speed (128)
Rate of transitions through zero of pitch speed squared (128)***
Tested pilot-Deviation RR from reference mean (128)
Tested pilot-Reference weight Sigma RR2 (64)
Tested pilot-Raw value of RR (8)
Tested pilot-Regression residuals RR over 32 heartbeats (I)
Non tested pilot-Raw value of RR (8)
Non tested pilot-Deviation RR from the mean over 16 heartbeats (128)
Non tested pilot-Deviation RR from the reference mean (64)
Non tested pilot-Reference weight Sigma $RR_1$ (64)
Non tested pilot-Reference weight Sigma $RR_2$ (64)
Non tested pilot-Deviation from the mean over 32 heartbeats (128)
Non tested pilot-Regression residuals RR over 32 heartbeats (I)

**The value shown in parentheses is the time constant in seconds for the sliding exponential average. "I" indicates an instantaneous value rather than a sliding average.
***These measurements are used by multiplying the measurement by its own value before it is multiplied by the coefficient.

CENTRAL DATA PROCESSING

As described in the foregoing, the main processing stage of the process according to the invention substantially comprises the combining of the aircraft data, the workload ratings data and the heart rate data and the computation of a set of measurements on the basis of these data, following preliminary synchronization with a reference clock. This main processing stage is illustrated in the simplified flow charts of FIGS. 19 through 23.

processing begins when a specific ratings file is read. Both the moment at which the observer requested the rating and the time interval between the request and the response are recorded. Only the instant at which the observer has asked for the rating is taken into account. One second is added to account for the time required by the pilot queried to press a switch 1a on his panel 1. A target time is obtained in this manner.

Once the target time has been established, the aircraft data are read and the corresponding measurements summed, until this target time is reached. Once the target time is reached on the aircraft tape, the heart rate data are entered for each pilot and the corresponding measurements are calculated. In the context of a preferred embodiment, a total of 279 measurements are obtained based on the aircraft data and 54 measurements are derived from the heart rate data of each pilot, for each rating.

In order to eliminate the possibility of obtaining too many independent variables, each measurement is subjected to a preliminary screening employing statistical techniques known as multiple graduated regression. One third of the variables are introduced at one time into a regression graduated according to an appropriate measurement of the pilot rating. The regression technique supplies the minimum linear least squares for all of the measurements which are equal to or greater than a predefined tolerance level.

Each of the graduated operations supplies from 15 to 20 measurements which provide the best forecast of the rating. These are then introduced into a final graduated regression to supply the set of measurements to be used in developing the model derived therefrom.

DEVELOPMENT OF THE MODEL

The development of the model per se more particularly follows the procedure of General Linear Models (GLM) as it is implemented in all SAS statistics (SAS Institute, Cary, North Carolina, U.S.A., 1982). This technique allows continuous digital measurements output by the aircraft (aircraft data) and the heart rate data to be combined with discrete data, that is, the aforesaid flight parameters.

By employing the foregoing procedure, according to the invention, the predetermined workload PR is related to the flight parameters by a relationship of the type:

$$Yi = A1\ X1i + A2\ X2i + \ldots + Aj\ Xij + \ldots (M)$$
$$+ An\ Xni + B1 + B2 + \ldots + Bk + \ldots + Bm + C$$

wherein:

Yi is a variable representing the predetermined workload PRi and related thereto by the aforesaid formula;

Xij are variables representing the aforesaid flight and heart rate data;

constants Aj, Bk and C are coefficients of multiplication or addition characteristic of the model, wherein the value of coefficients Bk denotes the aforesaid flight parameters. Coefficients Aj, Bk and C are calculated by applying, on the basis of the foregoing relationship, statistical methods known as multiple linear regression and analysis o variance based on the values provided by the pilot of his workload ratings and on the foregoing data and the flight parameters measured or recorded during the course of the test flights.

The "GLM" procedure implements an analysis of variance model (ANOVA) when discrete variables are employed. The mathematics of the analysis of variance approach is more complex than in the case of the regression model, and more than one solution becomes possible (there is probably no single set of coefficients). This is not considered to be a disadvantage in the context of the invention. The most significant feature of the model derived from this approach is that it is simple to calculate. Instead of finding a simple set of multiplier constants as in the regression model, the analysis of variance model also results in coefficients of addition. These are added to the estimate of the model only if the situation corresponds to a specific category of discrete variables (flight parameters).

An example may serve to clarify the structure of a general linear analysis of variance model such as the one provided by the invention. Assume the model (M) comprises a continuous variable, the flap position (F) and a discrete variable, for example, identification of the pilot as CM1 or CM2 (called pilot designation or D). The resulting model for evaluating workloads thus comprises the following elements:

a coefficient to be multiplied by the flap position and added either to:

a first coefficient of addition if the pilot at the controls is CM1 at the moment at which F was measured; or a second, different coefficient of addition if F was measured when pilot CM2 was at the controls and, an interception constant which is added to the two other elements in order to determine the final prediction.

The equation of the model is then written in the following form:

$$P = mF + (a1 \text{ if } D = CM1 \text{ or } a2 \text{ if } D = CM2) + i$$

where P is the predetermined workload, m is the coefficient of multiplication for the flap position, each a is a coefficient of addition for CM1 and CM2 respectively (values of D) and i is the interception constant.

In addition to using unique discrete variables in models of this type, it is also possible to employ interactions among classification variables. For example, the contribution of the interaction of a flight condition and flight stage may be introduced as a relevant value in the forecasts. This interaction may supply coefficients of addition for relations of flight stage and condition, for example an emergency or a malfunction at takeoff, check list during descent. As shall be demonstrated in the discussion which follows, classification variables and their coefficients of interaction have played an important role in the model developed, still further demonstrating the value of the approach of the general linear model.

STATISTICAL VALIDATION OF MODEL

Several methods of statistical analysis describe the suitability of the linear model to the general data. The value of greatest interest is the "Multiple R" value. This statistic is the coefficient of correlation between the forecast values of the dependent variable calculated by the model, that is, the workload, and the actual values. In the example, Multiple R represents the correlation between the actual workload ratings supplied by the pilots and the ratings transformed by using the aforesaid formula and the forecast values of the transformed rating. The value squared of Multiple R may also be directly interpreted a the variance ratio in the dependent variable (transformed values) explained by the model.

The statistical significance of the model as a whole may be tested by using a calculated value F. Value F represents the variance ratio explained by the model, its degrees of freedom relative to the error or to the unexplained remainder, and its degrees of freedom. When the significance of a value F is tested, probability levels of 0.05 (5 percent probability that an adaptation as accurate as that of the model could have been produced) are often accepted as significant from a statistical standpoint. Probability values of 0.01 at least leave few doubts with respect to the statistical significance of the model, which was clearly not a result of chance.

A model must be significant from a statistical standpoint before it can be said to be valid. However, a value of F which is significant from a statistical standpoint does not represent a guarantee of validity. It only signifies that the model developed was able to forecast the data on which it was based better than at random. Validation on an independent sample, that is, a sample of measurements not employed in calculating the model, is needed to demonstrate validity. The method of "divided halves," the stages of which are illustrated in FIG. 10, may be used to demonstrate the validity of the model. According to this method, half of the data compiled during the test flights is used to develop the model, while the other half is used to validate it, that is, for this second half, predetermined workload values are calculated using the foregoing relationship and are compared to the actual ratings values. As a variation, special flights may be made during which data that may be used to validate the model are logged.

The preferred embodiment of the invention is detailed in Tables IIIb and IV below.

TABLE IIIb

| Variables $X_{ij}$ | COEFFICIENT OF MULTIPLICATION $A_j$ |
|---|---|
| Decimal logarithm of angle of roll (128)** | 0.05771089 |
| Rate of inversions of aerodynamic speed (64) | 0.00114733 |
| Rate of inversions of angle of incidence (64) | −0.00403249 |
| Rate of inversions of speed N1 of engine 1 (128) | −0.00327516 |
| Speed N1 of engine N1 (128) | −0.00107951 |
| Decimal logarithm of rudder angle (32) | 0.00967576 |
| Rate of transitions through zero of angle of roll squared (128)*** | 0.00029009 |
| Decimal logarithm of number of automatic flight controls engaged (I) | −0.13144402 |
| Rate of transitions through zero of roll speed (128) | 0.00888219 |
| Rate of transitions through zero of roll speed squared (128)*** | −0.00026902 |
| Tested pilot-Deviation RR from reference mean (128) | 0.00202818 |
| Tested pilot-Reference weight Sigma RR2 (64) | 0.00365653 |
| Tested pilot-Raw value of RR (8) | 0.00031228 |
| Tested pilot-Regression residuals RR over 32 heartbeats (I) | 5.3414072E-06 |
| Non tested pilot-Raw value of RR (8) | −0.00037668 |
| Non tested pilot-Deviation RR from the mean over 16 heartbeats (128) | 0.01038512 |
| Non tested pilot-Deviation RR from the reference mean (64) | 0.11703052 |
| Non tested pilot-Reference weight Sigma $RR_1$ (64) | −0.26649027 |
| Non tested pilot-Reference weight Sigma $RR_2$ (64) | 0.15181157 |
| Non tested pilot-Deviation from to the mean | −0.01318688 |

TABLE IIIb-continued

| Variables $X_{ij}$ | COEFFICIENT OF MULTIPLICATION $A_j$ |
|---|---|
| over 32 heartbeats (128) | |
| Non tested pilot-Regression residuals | −0.00326222 |
| RR over 32 heartbeats (I) | |

\*\*The value shown in parentheses is the time constant in seconds for the sliding exponential average. "I" indicates an instantaneous value rather than a sliding average.
\*\*\*These measurements are used by multiplying the measurement by its own value before it is multiplied by the coefficient.

TABLE IV

| FLIGHT PARAMETERS | COEFFICIENT OF ADDITION $B_k$ |
|---|---|
| Evaluation by pilot CM1 flying | −0.01128010 |
| Evaluation by pilot CM1 not flying | −0.03695012 |
| Evaluation by pilot CM2 flying | −0.02018463 |
| Evaluation by pilot CM2 not flying | 0.00000000 |
| Both ECAM systems disabled (no ECAM systems engaged) | 0.03846630 |
| One ECAM system disabled (one ECAM system engaged) | 0.00036457 |
| Both ECAM systems engaged | 0.00000000 |
| Go around or rapid descent with both FMS (flight management systems) engaged | 0.00000000 |
| Pre-flight with both FMS disabled | −0.01271110 |
| Pre-flight with one FMS disabled and one FMS engaged | −0.22427695 |
| Pre-flight with both FMS engaged | 0.00000000 |
| Taxiing prior to takeoff with both FMS disabled | 0.01688276 |
| Taxiing prior to takeoff with one FMS disabled and one FMS engaged | 0.07965894 |
| Taxiing prior to takeoff with both FMS engaged | 0.00000000 |
| Takeoff with both FMS disabled | −0.01649307 |
| Takeoff with one FMS disabled and one FMS engaged | −0.02033955 |
| Takeoff with both FMS engaged | 0.00000000 |
| Ascent with both FMS disabled | −0.03001335 |
| Ascent with one FMS disabled and one FMS engaged | 0.01695141 |
| Ascent with both FMS engaged | 0.00000000 |
| Cruising with both FMS disabled | 0.05614202 |
| Cruising with one FMS disabled and one FMS engaged | −0.10278220 |
| Cruising with both FMS engaged | 0.00000000 |
| Descent with both FMS disabled | 0.03471076 |
| Descent with one FMS disabled and one FMS engaged | 0.01862299 |
| Descent with both FMS engaged | 0.00000000 |
| Malfunction or Emergency, including pilot CM1 disabled | 0.04277797 |
| Malfunction or Emergency check list | 0.06829986 |
| Check list during routine flight | 0.03892804 |
| Routine flight without check list | 0.00000000 |
| Go Around or Emergency Descent | 0.05458590 |
| Pre-flight | −0.09502411 |
| Taxiing prior to takeoff | −0.07419961 |
| Takeoff | 0.02750070 |
| Ascent | 0.02952791 |
| Cruising | 0.01699097 |
| Descent | 0.00673707 |
| Approach | 0.03832675 |
| Landing | 0.03482687 |
| Taxiing post landing | 0.00000000 |
| Approach with both FMS disabled | −0.1405300 |
| Approach with one FMS disabled and one FMS engaged | −0.04206698 |
| Approach with both FMS engaged | 0.00000000 |
| Landing with both FMS disabled | −0.07434618 |
| Landing with both FMS engaged | 0.00000000 |
| Taxiing post landing with both FMS disabled | −0.11597344 |
| Taxiing post landing with one FMS disabled and one FMS engaged | −0.07514224 |
| Taxiing post landing with both FMS engaged | 0.00000000 |
| Go around or emergency descent with automatic thrust lever engaged | 0.00000000 |
| Pre-flight with automatic thrust lever disengaged | 0.18152502 |
| Pre-flight with automatic thrust lever engaged | 0.00000000 |
| Taxiing with automatic thrust lever disengaged | −0.10494458 |
| Taxiing with automatic thrust lever engaged | 0.00000000 |
| Takeoff with automatic thrust lever disengaged | −0.3796761 |
| Takeoff with automatic thrust lever engaged | 0.00000000 |
| Ascent with automatic thrust lever disengaged | −0.02778540 |
| Ascent with automatic thrust lever engaged | 0.00000000 |
| Cruising with automatic thrust lever disengaged | 0.13777431 |
| Cruising with automatic thrust lever engaged | 0.00000000 |
| Descent with automatic thrust lever disengaged | 0.07989134 |
| Descent with automatic thrust lever engaged | 0.00000000 |

TABLE IV-continued

| FLIGHT PARAMETERS | COEFFICIENT OF ADDITION Bk |
|---|---|
| Approach with automatic thrust lever disengaged | 0.04462338 |
| Approach with automatic thrust lever engaged | 0.00000000 |
| Landing with automatic thrust lever disengaged | −0.01322323 |
| Landing with automatic thrust lever engaged | 0.00000000 |

Table IIIb shows coefficients of multiplication Aj and the corresponding heart rate or aircraft measurement variables.

These coefficients are used by multiplying their value by the value of the corresponding measurement and by summing the results for the 21 measurements considered (10 relating to the aircraft and 11 relating to heart rate). For example, the decimal logarithm of the exponential average at 128 seconds of the angle of roll is multiplied by 0.05771089 and the result is added to the product of the exponential average at 64 seconds of the rate of inversions of aerodynamic speed by 0.00114733, etc., until all 21 measurements multiplied by their respective coefficient have been summed.

It is noted that two measurements are squared (the exponential average at 128 seconds of the rate of transitions through zero of the angle of roll and the exponential average at 128 seconds of the rate of transitions through zero of the roll speed).

Table IV provides the detail of the coefficients of addition of the model. These coefficients are associated to flight status variables and the interaction thereof. These variables are the following:
- the flight condition;
- the flight stage;
- the pilot's role;
- the number of ECAM systems engaged, that is, the number of electronic central aircraft management systems in operation at the instant of the rating;
- the number of FMS systems engaged, that is, the number of flight management systems in operation at the instant of the rating.

The flight condition, flight stage, pilot role and number of ECAM systems engaged are of preponderant significance to the model. Indeed, there is a coefficient of addition for each level of these status variables. For example, there are distinct coefficients of addition for ascent (a flight condition), pilot CM1 not flying the aircraft (a pilot role level) and the situation of a flight with a disabled ECAM system. The number of FMS systems engaged and the status of the automatic thrust lever intervene and interact with the flight stage. Thus, a coefficient of addition is calculated for each combination of flight stage and the number of FMS systems engaged or the automatic thrust lever status that are present in the data.

The coefficients of addition are added to the sum of the products of the coefficients of multiplication by the related flight measurements if and only if the workload rating corresponds to the flight status condition under consideration. For example, if the rating corresponds to pilot CM1 at the aircraft controls during a routine check list during descent with the automatic thrust lever disengaged and all FMS and ECAM systems engaged, the following coefficients are added:

| | |
|---|---|
| CM1 pilot flying aircraft: | −0.01128010 |

| | |
|---|---|
| check list during a routine flight: | −0.03892804 |
| descent: | 0.00673707 |
| descent with both FMS systems engaged: | 0.00000000 |
| both ECAM systems engaged: | 0.00000000 |
| descent with automatic thrust lever disengaged: | 0.07989134. |

There also exists a constant called interception constant having a value of 0.18425416 which is added for each rating.

Multiple R of the model in question is equal to 0.664; given the relatively low number of dependent variables $X_{ij}$ employed, this indicates a very good correlation between the forecast workload value and the rated value. Value F for this model is 15.21 with 64 degrees of freedom, which is significant with a probability lower than 0.0001. That is, there is less than one chance in 10000 for a model so well adapted to the recorded data to be the result of chance.

CONCRETE VALIDATION OF THE MODEL

Validation of the foregoing model based on the method of "divided halves" has also helped to demonstrate the reliability of the model developed.

Based on the aforesaid statistical properties of the model, it is possible to conclude with complete confidence that a valid model was developed. This model also displays a practical character insofar as the data employed in its development may be easily recorded during flight with limited instrumentation. Under these conditions, it is apparent that the model may be employed to produce instantaneous workload ratings in flight or in a simulator, using existing on-board computers or a microcomputer programmed for this purpose.

Another method of evaluating the practical nature of the model is to examine whether the relationships it suggests conform to what is actually experienced during the flights. Thus, the coefficients are examined to determine whether the suggested relationships are reasonable. For example, the fact that the logarithm of the number of engaged automatic flight controls is introduced in the model supplies a negative coefficient of multiplication. This indicates that workload is inversely related to the number of automatic flight controls engaged or to the extent of assistance received by the pilots from the automatic flight controls, which conforms to reality.

The validity of the model was also checked by calculating a predetermined workload for each of the ratings used to build the model. FIGS. 11 to 15 show comparative curves of the predetermined workload and the actual or subjective workload as a function of various flight parameters such as flight stage, pilot role or flight scenarios.

The flight scenarios in question are those listed in Table V which follows. These curves provide for evaluation of the accuracy of the model developed.

TABLE V

DESCRIPTION OF FLIGHT SCENARIOS

| SCENARIO NO. | MEL EQUIPMENT | MALFUNCTION | CONSEQUENCES |
|---|---|---|---|
| 1A | Left engine generator Automatic cockpit time control | none | manual cockpit temperature control |
| 1B | Left navigation display CRT (2) Automatic temperature control generator 1 | none | manual control-output temperature of generator |
| 1C | Left ECAM CRT Both FMS | none | conventional navigation |
| 1D | TCC (3) Left FMS Altimeter radio 1 | while cruising malfunction altimeter radio 2 | thrust lever manually engaged |
| 2 | TRP (4) | begin ascent: pilot disabled (at the observer's discretion) | thrust lever on manual control one pilot flying |
| 3A | FAC 1 (5) FAC 1 | begin descent: left engine malfunction at 2000 feet, go around at arrival | manual flight one engine out of service |
| 3B | FAC 2 FCC 2 (6) Left FMS | while cruising: right FMS malfunction begin descent: left engine malfunction | manual flight one engine out of service conventional navigation |
| 4 | None | 5 mn prior to descent: electrical fire (electrical box) | flight with restricted flight data initiation of electrical fire procedure |
| 5A | Both ECAM CRTs | while cruising: fuel pump malfunction copilot pitot heater malfunction de-icer malfunction pressure system malfunction systems restored after identification of malfunction and C/L application | demonstration of reading and monitoring system with disturbance of routine flight management |
| 5B | SCAC (7) | while cruising: FWC1 malfunction begin ascent: pressurization malfunction | demonstration of reading and monitoring systems with disturbance of routine flight management |
| 5C | FWC1 (8) | while cruising: fuel pump malfunction copilot pitot heater malfunction de-icer malfunction pressurization system malfunction systems restored after identification of malfunction and C/L appli- | demonstration of reading and monitoring systems with disturbance of routine flight management |

TABLE V-continued

DESCRIPTION OF FLIGHT SCENARIOS

| SCENARIO NO. | MEL EQUIPMENT | MALFUNCTION | CONSEQUENCES |
|---|---|---|---|
| 6 | PMC (9) Pressurization system 1 | cation Just before TOD (10), malfunction of pressurization system 2 | rapid descent followed by diversion/disengagement landing |

(1) Minimum equipment list
(2) Cathode Ray Tube
(3) Thrust control computer
(4) Thrust rating panel
(5) Flight augmentation computer
(6) Flight control computer
(7) Digital-analog converter switch
(8) Flight warning computer
(9) Performance management computer
(10) Top of descent In order to estimate the significance of the loss of forecasting capability if the heart rate measurements were not introduced in developing the model, a second model using only aircraft data and status parameters was developed. The variables employed in this model and the corresponding coefficients are listed in Table VI below. Although this simplified model has proven to be significant from a statistical standpoint, its forecasting capacities are inferior to those of the preferred model of the invention. Multiple R of the said model is only 0.52794 and this value of R is believed to be too low to consider that the simplified model in question provides adequate reliability.

TABLE VI

COEFFICIENTS OF THE MODEL USING ONLY AIRCRAFT DATA
COEFFICIENTS OF MULTIPLICATION*

| MEASUREMENT | COEFFICIENT OF MULTIPLICATION |
|---|---|
| Decimal logarithm of angle of roll (128)** | 0.05834188 |
| Rate of inversions of anemometric values (64) | 0.00093520 |
| Decimal logarithm of angle of incidence (16) | 0.01313701 |
| Rate of inversions of angle of incidence (8) | 0.00072914 |
| Rate of inversions of angle of incidence (64) | −0.00516258 |
| N1 Engine ≠ 1 rate of inversion (128) | −0.00033918 |
| Thrust lever angle ≠ 1 Inversions (128) | 0.00113424 |
| Absolute difference between inversions of thrust lever angles (64) | −0.00089320 |
| Decimal logarithm of number of AFC modes (CADV) engaged (I) | −0.04726963 |
| Decimal logarithm of horizontal tail angle (32) | −0.03979384 |
| Decimal logarithm of order of pitch of rudder (8) | −0.01314656 |
| Decimal logarithm of rudder angle (32) | 0.01824641 |
| Rate of inversions of rudder angle (32) | 0.00070730 |
| Rate of inversions of angle of pitch (8) | −0.00030736 |
| Decimal logarithm of longitudinal acceleration (32) | 0.04581542 |
| Value up to and including zero of longitudinal acceleration (16) | 0.00238442 |
| Rate of inversions of longitudinal acceleration (16) | −0.00060730 |
| Decimal logarithm of flap position (I) | 0.00325275 |
| Decimal logarithm of pitch speed (64) | 0.00425131 |
| Value up to and including zero of pitch speed (64) | −8.9090386E−5 |
| Value up to and including zero of roll speed (128) | −0.00207023 |
| Rate of inversions of vertical acceleration (16) | 0.00028602 |

COEFFICIENTS OF THE MODEL USING AIRCRAFT DATA ALONE
COEFFICIENTS OF ADDITION***

| WORKLOAD RATING CONDITION*** | COEFFICIENT OF ADDITION |
|---|---|
| Malfunction or emergency including CM1 disabled | 0.08752674 |
| Malfunction or emergency check list | 0.03175946 |
| Check list during routine flight | −0.03447097 |
| Routine flight without check list | 0.00000000 |
| Go around or emergency descent | 0.08589053 |
| Pre-flight | −0.33573995 |
| Taxiing prior to takeoff | −0.04527509 |
| Takeoff | 0.00167179 |
| Ascent | −0.04318535 |
| Cruising | −0.00204135 |
| Descent | 0.05925916 |
| Approach | 0.04052923 |
| Landing | 0.07862515 |
| Taxiing post landing | 0.00000000 |
| Preflight malfunction/emergency | 0.20938602 |
| Malfunction/emergency while taxiing prior to takeoff | 0.30883981 |
| Malfunction/emergency during ascent | −0.10548680 |

TABLE VI-continued

| | |
|---|---|
| Malfunction/emergency while cruising | 0.02265858 |
| Malfunction/emergency during descent | −0.05014735 |
| Malfunction/emergency while landing | 0.02748625 |
| Malfunction/emergency while taxiing after landing | 0.00000000 |
| Emergency check list while cruising | 0.18715066 |
| Emergency check list during descent | 0.03320660 |
| Emergency check list during approach | 0.01275090 |
| Emergency check list while landing | 0.00000000 |
| Routine check list during pre-flight | 0.09255541 |
| Routine check list while taxiing prior to takeoff | 0.06003368 |
| Routine check list during ascent | 0.07289595 |
| Routine check list while cruising | 0.12555574 |
| Routine check list during descent | 0.05839350 |
| Routine check list during approach | 0.03380438 |
| Routine check list while landing | −0.02361849 |
| Routine check list while taxiing after landing | 0.00000000 |
| Go around or emergency descent in Scenarios 3A or 3B | −0.06047917 |
| Go around or emergency descent in Scenarios, 5a, 5B or 5C | 0.00547621 |
| Go around or emergency descent in Scenario 6 | 0.00000000 |
| Pre-flight in Scenarios 1A, 1B, 1C or 1D | 0.28182377 |
| Pre-flight in Scenario 2 | 0.22478014 |
| Pre-flight in Scenarios 3A or 3B | 0.24351973 |
| Pre-flight in Scenarios 5A, 5B or 5C | 0.32000730 |
| Taxiing prior to takeoff in Scenarios 1A, 1B, 1C or 1D | 0.01120371 |
| Taxiing prior to takeoff in Scenario 2 | −0.09609632 |
| Taxiing prior to takeoff in Scenarios 3A or 3B | −0.01332814 |
| Taxiing prior to takeoff in Scenarios 5A, 5B or 5C | 0.02574656 |
| Taxiing prior to takeoff in Scenario 6 | 0.00000000 |
| Takeoff in Scenarios 1A, 1B, 1C or 1D | −0.03798744 |
| Takeoff in Scenario 2 | 0.05228940 |
| Takeoff in Scenario 3A or 3B | −0.02070000 |
| Takeoff in Scenario 5A, 5B or 5C | −0.01730159 |
| Takeoff in Scenario 6 | 0.00000000 |
| Ascent in Scenarios 1A, 1B, 1C or 1D | 0.00563219 |
| Ascent in Scenario 2 | −0.03161124 |
| Ascent in Scenarios 3A or 3B | 0.01951183 |
| Ascent in Scenarios 5A, 5B or 5C | 0.07368082 |
| Ascent in Scenario 6 | 0.00000000 |
| Cruising in Scenarios 1A, 1B, 1C or 1D | 0.01689474 |
| Cruising in Scenario 2 | 0.05292911 |
| Cruising in Scenarios 3A or 3B | 0.02314432 |
| Cruising in Scenarios 5A, 5B or 5C | 0.00938397 |
| Cruising in Scenario 6 | 0.00000000 |
| Descent in Scenarios 1A, 1B, 1C or 1D | −0.03121730 |
| Descent in Scenario 2 | 0.08713032 |
| Descent in Scenarios 3A or 3B | −0.02917356 |
| Descent in Scenarios 5A, 5B or 5C | −0.06624218 |
| Descent in Scenario 6 | 0.00000000 |
| Approach in Scenarios 1A, 1B, 1C or 1D | 0.00523105 |
| Approach in Scenario 2 | 0.07847470 |
| Approach in Scenarios 3A or 3B | −0.02288651 |
| Approach in Scenarios 5A, 5B or 5C | −0.00445375 |
| Approach in Scenario 6 | 0.00000000 |
| Landing in Scenarios 1A, 1B, 1C or 1D | −0.01729109 |
| Landing in Scenario 2 | −0.02280544 |
| Landing in Scenarios 3A or 3B | −0.06915574 |
| Landing in Scenarios 5A, 5B or 5C | 0.02389426 |
| Landing in Scenario 6 | 0.00000000 |
| Taxiing post landing in Scenarios 1A, 1B, 1C or 1D | 0.03157858 |
| Taxiing post landing in Scenarios 3A or 3B | 0.08575654 |
| Taxiing post landing in Scenarios 5A, 5B or 5C | 0.06807901 |
| Post-landing taxiing in Scenario 6 | 0.00000000 |
| Go around or emergency descent and PF rating | −0.03006523 |
| Go around or emergency descent and PNF rating | 0.00000000 |
| Pre-flight and PF rating | 0.02320635 |
| Pre-flight and PNF rating | 0.00000000 |
| Taxiing prior to takeoff and PF rating | −0.03853689 |
| Taxiing prior to takeoff and PNF rating | 0.00000000 |
| Takeoff and PF rating | 0.03387488 |
| Takeoff and PNF rating | 0.00000000 |
| Ascent and PF rating | −0.01280829 |
| Ascent and PNF rating | 0.00000000 |
| Cruising and PF rating | −0.03603436 |
| Cruising and PNF rating | 0.00000000 |
| Descent and PF rating | 0.00672002 |
| Descent and PNF rating | 0.00000000 |
| Approach and PF rating | 0.00495925 |
| Approach and PNF rating | 0.00000000 |
| Landing and PF rating | 0.04742134 |
| Landing and PNF rating | 0.00000000 |

TABLE VI-continued

| | |
|---|---|
| Taxiing post landing and PF rating | −0.04454874 |
| Taxiing post landing taxiing and PNF rating | 0.00000000 |
| INTERCEPTION (constant added in all estimates) | 0.11550363 |

*These coefficients are used by multiplying the absolute value of the measurement by the coefficient then by summing all of the results. The coefficients annotated by "E" are read as the value preceding "E" multiplied by 10 to the power following "E".
**The value in shown in parentheses is the time constant in seconds for the sliding exponential average. "(I)" indicates an instantaneous value rather than a sliding average.
***The coefficents of addition are summed with the overall sum of the products of the coefficients of multiplication and their measurements if workload ratings are made under the circumstances described in the first column.
PF = pilot flying
PNF = pilot not flying The validity, reliability and realism of the preferred embodiment developed do not necessarily confer a universal character upon this embodiment. However, none of the variables employed in developing the model displays a nature likely to prevent this model from being applicable to any commercial airliner having characteristics and performances similar to those of the AIRBUS A 310 employed in developing the preferred model of this invention. In addition, the method of general linear models employed may, if need be, allow for the introduction of aircraft type as a dependent variable.

APPLICATIONS OF THE MODEL

The forecasting reliability of the model and its ability to follow pilot ratings in the complete range of routine and emergency flying conditions and flight stages available from the data provide for three major categories of application.

The model may be employed as an aid in the development of a new aircraft. One of the fundamental advantages of any mathematical model is its ability to facilitate decision-making. However, it is important to realize that models are only an aid in the decision-making process and that they are subject to error. They perfectly manipulate interactions among relatively large numbers of variables insofar as the relationships among these variables are fully understood. No single effort to develop the complex "man-machine" system represented by a modern commercial aircraft could hope to identify and quantify all of these relationships. The statistics relative to the model indicate that its forecasts are much more accurate than random forecasts. Persons having in-depth knowledge of aircraft systems should thus be able to use the model to improve the efficiency of operating procedures.

The availability of one model or several models which can summarize the complex interactions between the aircraft, the pilots and the flight management system and their influence on the pilot's assessment of workload may present a positive interaction in the process of developing a new aircraft. Indeed, several different applications are envisioned.

First, a model may take part in the simulation of any new or modified aircraft This allows the designers to base their systems research decisions on their probable influence on pilots' perceptions of their workload. For this purpose, it is more convenient to employ a model which does not comprise heart rate data such as the one described in Table VI appended hereto, since, in principle, heartbeat and heart rate fluctuation data are not compiled under actual flight situations.

Similarly, these models may be used as investigational systems to supply information on the possible impact of the variation of one or more parameters of the model on workloads. All of the parameters of the data base used for this purpose are thus held to the values used to build the model, except for a few which are made to vary systematically to determine their effect on the predicted workload. For example, measurements related to engine controls such as inversions of the thrust lever angle and inversions of speed Nl could be varied to determine the potential workload reduction if an additional thrust control computer (TCC) were included to further aid pilots following a TCC malfunction. Rapid review of a broad range of possibilities is one of the special features of mathematical models. In this instance, it is made easier because the model may be calculated and all of its corresponding data stored in a microcomputer of modest size.

The model may also be used in a reverse manner to aid in defining research objectives. This third approach is similar to the second approach described above except that the value or the range of workloads represents a target and that one or more parameters are varied until the time that target is reached under the desired flight conditions. For example, the following question may be asked:

"What is the significance of the reduction of inversions of the thrust lever angle needed to maintain the workload predicted at 5 or even less after engine or TCC malfunctions?"

A correct estimate of the reduction needed could be obtained by manipulating thrust lever angle inversion values while holding the other measurements fixed to the values of scenarios displaying engine and TCC malfunctions.

With respect to pilot training and/or skills development, the workload considerations may display at least three advantages. First, while the training programs are being designed and the flight protocols developed, it is desirable to obtain a range of workload situations. This helps to ensure that the performance of pilots undergoing training can be observed under various conditions. The availability of the model and the information it contains allows it to design training scenarios that reach the desired subjective workload level without requiring experienced pilots to undertake flights and to evaluate the proposed scenarios.

Second, in the context of training, the model may be used to measure the moment at which the performance threshold is reached. It can be assumed that inexperienced pilots have heart rates that differ from those of experienced pilots whose data are used to build the model. By repeating the same flight scenario during the various training stages and by comparing the results with the model's forecast, it may be possible to determine the moment when a pilot has reached a competence level sufficient to assign to him subjective workloads equivalent to those of experienced pilots. It is clear that a standardized database of the model as a function of the pilot should be developed before this application in the context of training can become fully operational.

Finally, in the same context, the model may be used as a selection tool. In the course of training, pilots may tend to underrate the magnitude of the workload they are subjected to in an attempt to impress their instructors. The model is not affected by this deformation since it is based on variables which the pilot cannot consciously control, more particularly the heart rate. The model may therefore be able to identify those pilots who experience a workload level which is unacceptable although they may not admit it. However, it is necessary to accumulate significant operations experience and a large data base prior to implementing such an application.

Thus, the model according to the invention may be employed to monitor the performance and rate of adaptation of a pilot to a new aircraft.

The most direct application of the model is that which replaces the long and costly process through which subjective workload ratings are obtained during the process of certification of crew assignments for new aircraft The model developed under certification flight trial conditions displays undeniable validity in this context.

If the model is used in the place of certification flights, the data may be compiled while the aircraft is undergoing flight trials, for example during other stages of the certification procedure and of the process of introducing the aircraft to airlines and government agencies. Based on these data, a profile of forecast workload ratings may be obtained. This profile may be compared to the real or forecast ratings of previously certified aircraft It would be necessary to undertake additional specific flights to measure workload alone in order to make forecasts on situations, that is, on emergencies that are not demonstrated by the aforesaid flights.

The model employed during certification flights may also be used in a very profitable manner to replace subjective ratings. It is demonstrated that subjective ratings are subject to significant individual variations from pilot to pilot, including to different reactions in the face of different flight conditions. At this time, there exists no other means to explain or to control these differences other than to have several pilots perform the same maneuver and to average their respective ratings. For example, if one considers what would occur if a pilot on a given flight during a maneuver were to provide a subjective workload rating of 7, the consequences of a ratings error could be very serious. It would be necessary to immediately determine whether this rating was an actual rating, that is, whether a similar rating could be expected from other pilots under the same conditions. The model point out the so of the excessive workload.

The model according to the invention may also be implemented to objectively determine the number and composition of the technical flight crew needed for a given aircraft.

This invention consequently demonstrates that a model which is able to forecast the workload of an aircraft pilot may be developed on the basis of objective flight parameters and displays the necessary forecasting capabilities to be convenient in its application. The model obtained is a valid and reliable means of forecasting the subjective ratings supplied by pilots.

It is understood that such a model could also be used to forecast the workload of the pilot of another type of aircraft such as a helicopter or even that of the driver of an automobile or the captain of a space shuttle, rocket or ship.

We claim:

1. A method for producing the statistical model for predicting a workload that an aircraft places on a pilot during actual or simulated flight as a function of predetermined objective flight parameters, the method comprising the steps of:
    (a) defining a set of predetermined objective flight parameters corresponding to different preselected aircraft flight data, flight conditions of the aircraft, flying conditions, and flight stages;
    (b) generating a signal prompting the pilot during n actual or simulated flight of the aircraft to rate his current workload according to a predefined scale;
    (c) logging the workload rating made by the pilot in response to the prompting signal;
    (d) measuring values of significant data of a plurality of applicable flight parameters when the prompting signal for a workload rating is generated;
    (e) logging the measured values of the applicable flight parameters simultaneously with step (c);
    (f) repeating steps (b) through (e) at least once in each of the preselected flight stages;
    (g) correlating the workload ratings and flight parameters from step (f) to produce a statistical model of the workload on the pilot as a function of the flight parameters.

2. The process of claim 1 wherein step (g) comprises entering each workload rating and the measured values of the associated flight parameters obtained in step (f) into a relationship of the type:

$$Y_i = A1\ Z_{i1} + A2\ X_{i2} + \ldots + An\ X_{in} + B1 + B2 + \ldots + Bk + \ldots + Bm + C,$$

wherein:
    $Y_i$ is a variable related to a pilot workload $PR_i$ for a particular set of flight parameters;
    $X_{ij}$ are available representing the significant data of a first set of flight parameters;
    $A_j$ are coefficients of multiplication;
    $B_k$ are coefficients of addition denoting a second set of flight parameters; and
    C is an interception coefficient,
and then applying statistical analysis methods to the entered data.

3. The process of claim 2 wherein the first set of flight parameters represented by variables $X_{ij}$ are flight data relating to the aircraft itself, and the second set of flight parameters corresponding to coefficients $B_k$ are the concurrent aircraft flight conditions, the flying conditions, and the flight stage.

4. The process of claim 2 wherein the first set of flight parameters related to the aircraft itself and the second set of flight parameters which determine the coefficients $B_k$ employed in the development of the statistical model are successively listed in the tables below:

| AIRCRAFT DATA | SIGNIFICANT UNIT | RANGE |
| --- | --- | --- |
| Rudder Angle | Degrees | +/− 180 |
| Angle of roll | Degrees | +/− 180 |
| Roll Speed | Degrees/sec | +/− 128 |
| Aerodynamic speed | Knots | 15 to 450 |

-continued

| Angle of incidence | Degrees | +/− 60 |
|---|---|---|
| Speed N2 of engine 1 | rpm | 0 to 4400 |

| DATA No. | DATA (AUTOMATIC FLIGHT CONTROLS) |
|---|---|
| 23 | Altitude |
| 24 | Vertical speed (Vz) |
| 25 | Flare-out |
| 26 | Take-off computer (go around) |
| 27 | Take-off computer (take-off) |
| 28 | Level change |
| 29 | Radio guidance system (guide slope) |
| 30 | Longitudinal modes-following |
| 31 | Longitudinal modes-capture |
| 32 | Navigation |
| 33 | Course maintenance |
| 34 | Course selection |
| 35 | Radio guide azimuth (localizer) |
| 36 | Taxiing |
| 37 | Take-off |
| 38 | Taxiing (go around) |
| 39 | Lateral modes-capture |
| 40 | VOR |
| 41 | Lateral modes-following |
| 42 | Alignment |
| 43 | Transparent Piloting Engine Conditioning |
| 44 | Engine Conditioning Control |

FLIGHT PARAMETERS

Ascent with both FMS (Flight Management Systems) disabled
Ascent with one FMS disabled and one FMS engaged
Ascent with both FMS engaged
Cruising with both FMS disabled
Cruising with one FMS disabled and one FMS engaged
Cruising with both FMS engaged
Descent with both FMS disabled
Descent with one FMS disabled and one FMS engaged
Descent with both FMS engaged
Approach with both FMS disabled
Approach with one FMS disabled and one FMS engaged
Approach with both FMS engaged
Landing with both FMS disabled
Landing with both FMS engaged
Taxiing post landing with both FMS disabled
Taxiing post landing with one FMS disabled and one FMS engaged
Taxiing post landing with both FMS engaged
Go around or emergency descent with automatic thrust lever engaged
Pre-flight with automatic thrust lever disengaged
Pre-flight with automatic thrust lever engaged
Taxiing with automatic thrust lever disengaged
Taxiing with automatic thrust lever engaged
Takeoff with automatic thrust lever disengaged
Takeoff with automatic thrust lever engaged
Ascent with automatic thrust lever disengaged
Ascent with automatic thrust lever engaged
Cruising with automatic thrust lever disengaged
Cruising with automatic thrust lever engaged
Descent with automatic thrust lever disengaged
Descent with automatic thrust lever engaged
Approach with automatic thrust lever disengaged
Approach with automatic thrust lever engaged
Landing with automatic thrust lever disengaged
Landing with automatic thrust lever engaged 5. The process of claim 3 or 4 wherein the variables $X_{ij}$ also denote heart rate and heart rate fluctuations of the aircraft pilot that were recorded at the same times as the logging of the ratings by the pilot.

6. The process of claim 1 wherein step (b) further comprises simultaneously generating a signal prompting a copilot to rate his current workload, and step (c) further comprises logging the workload rating made by the copilot and the position in the cockpit of the one of the pilot and copilot who is flying the aircraft at the time of logging the rating.

7. The process of claim 2 wherein the predefined rating scale of step (b) comprises six rating indexes ranging from 2 to 7, in the order of increasing workloads.

8. The process of claim 7 wherein the pilot workload $PR_i$ expressed by the predefined workload ratings scale is a function of the variable $Y_i$ according to the relation:

$$PR_i = 3 \times 10^{Y_i} + 1.$$

9. The process of claim 2 wherein variables $X_{ij}$ comprise the variables listed in the following table:

| Variable $X_{ij}$ |
|---|
| Decimal logarithm of the angle of roll (128) |
| Rate of inversions of aerodynamic speed (64) |
| Rate of inversions of the angle of incidence (64) |
| Rate of inversions of the speed N1 of engine 1 |
| Speed N1 of engine 1 (128) |
| Decimal logarithm of the rudder angle (32) |
| Rate of transitions through zero of the angle of roll squared (128) |
| Decimal logarithm of the number of automatic flight controls engaged |
| Rate of transitions through zero of the roll speed (128) |
| Rate of transitions through zero of the roll speed squared (128). |

10. The process of claim 5 wherein variable $X_{ij}$ comprise the variable listed in the following table:

| Variable $X_{ij}$ |
|---|
| Decimal logarithm of the angle of roll (128) |
| Rate of inversions of aerodynamic speed (64) |
| Rate of inversions of the angle of incidence (64)222 |
| Rate of inversions of the speed N1 of engine 1 |
| Speed N1 of engine 1 (128) |
| Decimal logarithm of the rudder angle (32) |
| Rate of transitions through zero of the angle of roll squared (128) |
| Decimal logarithm of the number of automatic flight controls engaged |
| Rate of transitions through zero of the roll speed (128) |
| Rate of transitions through zero of the roll speed squared (128) |
| Tested pilot-Deviation of RR from the reference mean (128) |
| Tested pilot-Reference weight Sigma RR (64) |
| Tested pilot-Raw RR value (8) |
| Tested pilot-Regression residuals of RR over 32 heartbeats |
| Non tested pilot-Raw RR value (8) |
| Non tested pilot-Deviation of RR from the mean over 16 heartbeats (128) |
| Non tested pilot-Deviation of RR from the reference mean (64) |
| Non tested pilot-Reference weight Sigma $RR_1$ (64) |
| Non tested pilot-Reference weight Sigma $RR_2$ (64) |
| Non tested pilot-Deviation of RR from the mean over 32 heartbeats (128) |
| Non tested pilot-Regression residuals of RR over 32 heartbeats. |

11. Apparatus for producing a statistical model that predicts a workload that an aircraft places on a pilot during an actual or simulated flight of the aircraft as a function of predetermined objective flight parameters, the apparatus comprising:
   means for generating, during at least one selected flight stage of the aircraft, a signal prompting the pilot to rate his current workload according to a predefined scale;
   means for logging the workload rating made by the pilot in response to the prompting signal;
   means for measuring significant data of at least one set of predetermined flight parameters at the time of generating the signal prompting the pilot;
   means for logging the measured significant data of the at least one set of predetermined flight parameters; and a reference time clock for synchronizing each logged workload rating with the corresponding logged significant data of the flight parameters.

12. The apparatus of claim 11 wherein the means for logging the workload rating made by the pilot comprises a panel having means for displaying a prompting signal and means for logging a rating response made in accordance with a predefined rating scale, and the means for generating a prompting signal for the pilot to rate his current workload comprises means to address a prompting signal to a selected one of a plurality of crew members and means for logging the corresponding flight parameters.

13. The apparatus of claim 11 further comprising means for measuring and recording electrocardiograms of selected crew members in synchronization with the reference time clock.

14. The apparatus of claim 11 or 12 further comprising means for filming images of the cockpit, means for displaying and recording said filmed images, and means for overlaying output data from the means for generating a prompting signal and the workload rating logging means onto the display means.

15. A method for producing a statistical model for predicting a workload that an aircraft designated as a reference aircraft places on a pilot during actual or simulated flight as a function of predetermined objective flight parameters for use in certifying the reference aircraft and applying the statistical model of pilot workload as a function of predetermined flight parameters of the previously certified reference aircraft to the certification of crew assignments of a new aircraft, the model being in the form:

$$Yi = A1\ Xi1 + A2\ Xi2 + \ldots + Aj\ Xij + \ldots + An\ Xin + B1 + B2 + \ldots + Bk + \ldots + Bm + C,$$

wherein:
Yi is a variable representing a pilot workload for a particular set of flight parameters;
Xij are variables representing the significant data of a first set of flight parameters;
Aj are coefficients of multiplication determined by statistically correlating at least one set of logged pilot responses to requests for workload ratings during a plurality of flight stages of at least one actual or simulated flight of the aircraft with a set of simultaneously logged measurements of the significant data of the first set of flight parameters;
Bk are coefficients of addition denoting a second set of flight parameters and determined by statistically correlating said at least one set of logged pilot responses with a set of simultaneously logged measurements of the significant data of the second set of flight parameters; and
C is an interception coefficient, wherein the method comprises the steps of:
(a) defining a set of predetermined objective flight parameters corresponding to different preselected aircraft flight data, flight conditions of the reference aircraft, flying conditions, and flight stages;
(b) generating a signal prompting the pilot during an actual or simulated flight of the reference aircraft to rate his current workload Yi according to a predefined scale;
(c) logging the workload rating Yi made by the pilot in response to the prompting signal;
(d) measuring values Xij of significant data of a plurality of applicable flight parameters when the prompting signal for a workload rating is generated;
(e) logging the measured values Xij of the applicable flight parameters simultaneously with step (c);
(f) repeating steps (b) through (e) at least once in each of the preselected flight stages of the reference aircraft;
(g) correlating the workload ratings and flight parameters from step (f) to determine values of Bk and C so as to produce a statistical model of the workload Yi on the pilot of the reference aircraft as a function of the flight parameters;
(h) measuring the flight parameters defined in step (a) and denoted by variables Xij under various flight stages and conditions representative of predetermined certification rules during at least one test flight of the new aircraft;
(i) determine the status of the significant data Bk of the second set of flight parameters;
(j) calculating the corresponding values of the variable Yi by means of the model developed for the reference aircraft;
(k) deducing workload values according to a defined objective scale from the values of Yi calculated in step (j); and
(l) comparing the workload values of the new aircraft with the corresponding workload values of the previously certified reference aircraft.

16. The process of claim 15 wherein the variables Xij also denote heart rate and heart rate fluctuations of the aircraft pilot that were recorded at the same times as the logging of the ratings by the pilot.

* * * * *